United States Patent
Sana et al.

(10) Patent No.: US 8,926,313 B2
(45) Date of Patent: Jan. 6, 2015

(54) JIG USED FOR MANUFACTURING COMPOSITE MATERIAL STRUCTURE HAVING THICKENED WALL PORTION IN TRANSVERSE CROSS-SECTION

(75) Inventors: Toshikazu Sana, Kakamigahara (JP); Yasuo Hanafusa, Yatomi (JP); Hidehisa Nishina, Kurashiki (JP); Seiichi Oyama, Kurashiki (JP); Yuji Yamaguchi, Kurashiki (JP)

(73) Assignees: Kawasaki Jukogyo Kabushiki Kaisha, Kobe-Shi (JP); Kurashiki Kako Co., Ltd., Kurashiki-Shi (JP); Tsubakimoto Kogyo Co., Ltd., Osaka-Shi (JP)

( * ) Notice: Subject to any disclaimer, the term of this patent is extended or adjusted under 35 U.S.C. 154(b) by 83 days.

(21) Appl. No.: 13/395,266

(22) PCT Filed: Sep. 8, 2010

(86) PCT No.: PCT/JP2010/005501
§ 371 (c)(1),
(2), (4) Date: Apr. 27, 2012

(87) PCT Pub. No.: WO2011/033741
PCT Pub. Date: Mar. 24, 2011

(65) Prior Publication Data
US 2012/0219660 A1 Aug. 30, 2012

(30) Foreign Application Priority Data
Sep. 15, 2009 (JP) ................. 2009-213333

(51) Int. Cl.
*B29C 33/76* (2006.01)
*B29C 43/18* (2006.01)
(Continued)

(52) U.S. Cl.
CPC ............. *B29C 43/18* (2013.01); *B29C 43/10* (2013.01); *B29C 43/22* (2013.01); *B29C 43/3642* (2013.01); *B29C 43/3697* (2013.01); *B29C 70/44* (2013.01); *B29C 2043/3649* (2013.01); *B29K 2705/00* (2013.01); *B29L 2023/00* (2013.01); *B29L 2031/3082* (2013.01)
USPC ........ 425/470; 425/403; 425/389; 425/405.1; 264/257; 264/313

(58) Field of Classification Search
USPC ............ 425/403, 470, 389, 393, 405.1; 264/257, 313
See application file for complete search history.

(56) References Cited

U.S. PATENT DOCUMENTS 2,826,784 A * 3/1958 Pratt .............................. 425/389
4,065,242 A * 12/1977 Dickey et al. .................. 425/384
(Continued)

FOREIGN PATENT DOCUMENTS

JP    A-04-329125    11/1992
JP    A-08-000770    1/1996
(Continued)

OTHER PUBLICATIONS

Dec. 21, 2010 International Search Report issued in International Patent Application No. PCT/JP2010/005501 (with translation).

*Primary Examiner* — Joseph S Del Sole
*Assistant Examiner* — Nahida Sultana
(74) *Attorney, Agent, or Firm* — Oliff PLC

(57) ABSTRACT

A bladder-type jig used for manufacturing a stiffened panel structure using a hat stringer has the advantage that deformation of prepreg can be suppressed effectively, and durability of the jig can be improved so that repeated use of the jig is achieved. A body of the bladder includes a pipe-shaped portion and a coating film covering the outer peripheral surface of the pipe-shaped portion. The pipe-shaped portion is a main body portion of the body, and is made of a silicone rubber composition material such that its transverse cross-section has a trapezoidal pipe shape. Both side edge portions of an exposed wall portion corresponding to a lower base of the transverse cross-section are thickened edge portions which are greater in thickness than another wall portions. The thickened edge portions support the exposed wall portion from inward of the body, and can suppress the exposed wall portion from getting deformed inwardly.

12 Claims, 8 Drawing Sheets

(51) Int. Cl.
*B29C 43/10* (2006.01)
*B29C 43/22* (2006.01)
*B29C 43/36* (2006.01)
*B29C 70/44* (2006.01)
*B29K 705/00* (2006.01)
*B29L 23/00* (2006.01)
*B29L 31/30* (2006.01)

(56) References Cited

U.S. PATENT DOCUMENTS

| | | | |
|---|---|---|---|
| 4,632,328 A | 12/1986 | Bishop et al. | |
| 4,828,781 A * | 5/1989 | Duplessis et al. | 264/250 |
| 4,936,525 A * | 6/1990 | Daffix et al. | 244/3.24 |
| 5,425,628 A * | 6/1995 | Pinckney et al. | 425/389 |
| 5,939,007 A | 8/1999 | Iszczyszyn et al. | |
| 6,071,460 A * | 6/2000 | Renaudin et al. | 264/314 |
| 6,475,320 B1 * | 11/2002 | Masugi | 156/189 |
| 6,478,772 B2 * | 11/2002 | Maki et al. | 604/103.07 |
| 6,789,398 B1 * | 9/2004 | Daoud et al. | 65/357 |
| 7,758,793 B2 * | 7/2010 | Grankall et al. | 264/313 |
| 7,824,171 B2 * | 11/2010 | Hanson et al. | 425/389 |
| 8,043,554 B2 * | 10/2011 | Yip et al. | 264/573 |
| 8,262,869 B2 * | 9/2012 | Kouznetsov | 204/192.13 |
| 8,262,969 B2 * | 9/2012 | Wade et al. | 264/257 |
| 8,419,402 B2 * | 4/2013 | Guzman et al. | 425/110 |
| 8,668,800 B2 * | 3/2014 | Guitton | 156/246 |
| 8,684,343 B2 * | 4/2014 | Hiken et al. | 269/20 |
| 2009/0152775 A1 * | 6/2009 | Grankall et al. | 264/526 |
| 2010/0009124 A1 * | 1/2010 | Robins et al. | 428/156 |
| 2010/0139850 A1 * | 6/2010 | Morris et al. | 156/242 |
| 2010/0139857 A1 * | 6/2010 | Pham et al. | 156/286 |
| 2012/0219660 A1 * | 8/2012 | Sana et al. | 425/470 |
| 2012/0256348 A1 * | 10/2012 | Bergmann | 264/316 |
| 2013/0022702 A1 * | 1/2013 | Morris et al. | 425/440 |

FOREIGN PATENT DOCUMENTS

| | | |
|---|---|---|
| JP | A-2004-181758 | 7/2004 |
| JP | A-2005-161771 | 6/2005 |
| JP | A-2009-178988 | 8/2009 |
| WO | WO 2008/003768 A1 | 1/2008 |

* cited by examiner

JIG USED FOR MANUFACTURING COMPOSITE MATERIAL STRUCTURE HAVING THICKENED WALL PORTION IN TRANSVERSE CROSS-SECTION

TECHNICAL FIELD

The present invention relates to a jig for use in manufacturing a composite material structure using a fiber-reinforced resin composite material. Particularly, the present invention relates to an inflatable bag-shaped jig (bladder) for use as a jig of a hat (hat-shaped) stringer in manufacturing a structure using the hat stringer as a frame member.

BACKGROUND ART

In recent years, fiber-reinforced resin composite materials (hereinafter suitably referred to as "composite materials") have been widely used in fields in which metal materials have been used so far. Among the composite materials, carbon-fiber-reinforced materials which are formed such that carbon fibers used as reinforced fibers, are impregnated with matrix resin such as epoxy resin, have a smaller weight and a higher strength than metal materials. Because of this, the carbon-fiber-reinforced materials are widely used in fields of sport activity articles, industrial machines, and aerospace.

Among these fields, in the field of aerospace, for example, in structures such as wings or bodies of aircraft, a stiffened panel in which a skin comprising a composite material is integrated with a stiffener which is a lightweight metal frame member, has been used. As a typical stiffener, there is a stringer. The stringers are assembled in a shape conforming to the shape of a structure and then supported by jigs. Plural sheets of prepreg are stacked together with the stringers, and the resulting stack is pressurized and heated in an autoclave. As a result, the prepreg is cured into skin, and the stiffener is adhesively attached to and integrated with the skin, thereby forming a stiffened panel.

For example, as an example of the structure comprising the stiffened panel, a body of aircraft constituted by a one-piece barrel (OPB) will be described as an example. As shown in FIG. 9, there is illustrated a body 100 including stringers 20 assembled into a cylindrical structure and a skin 31 placed to surround the stringers 20.

There are various kinds of stringers depending mainly on a difference in cross-sectional shape. To be specific, there are known a flat plate shape, a columnar shape, a C-shape, an I-shape, an L-shape, a T-shape, and a hat shape. Among these, the hat stringer has recently attracted an attention, because it is suitable for weight saving of a structure, for the reason described below.

The aircraft is required to minimize its weight, but is required to have a sufficient strength. Because of this, a thickness of the skin which is a body of the stiffened panel cannot be set constant, but is set greater in a region required to have a higher strength and smaller in a region which can provide a sufficient strength, thereby achieving a reduced weight. The jig supporting the stringer is an elongated member extending along the stringer, and defines a positional relationship between the prepreg and the stringer. The jig is drawn out along its lengthwise direction after the prepreg is cured. Because of this, if the skin has a uniform thickness, a surface of the skin which contacts the stringer is flat. Therefore, it is relatively easy to draw out the jig having supported the stringer after the prepreg is cured. However, if the skin has many non-uniform thickness regions, unevenness is generated in the surface of the skin which contacts the stringer. The jig is also curved to correspond to the unevenness. In this case, it is difficult to draw out the jig.

The hat stringer has flat band-shaped portions extending in a lengthwise direction of the stringer, and a channel portion having a transverse cross-section recessed in a trapezoidal shape between the hand-shaped portions. If the structure is the body of the aircraft formed of the OPB, the band-shaped portions are surfaces (adhesion surfaces) adhesively attached to the inner surface of the skin. The hat stringers are placed along the lengthwise direction of the body with the adhesion surfaces being at an outer side, and are assembled into a predetermined structure, for example, a cylindrical structure. The prepreg is wound around outside of the cylindrical structure and stacked thereon. For example, a huge core jig is attached to the interior of the cylindrical structure. In a space formed between the skin and each of the hat stringers, i.e., inner side of the channel portion, an elongated jig called a bladder is inserted.

The bladder is made of a material having flexibility, and elasticity (stretchability). The bladder is inflatable (expandable) and contractible and has a structure of an elongated bag-shape. During a state where the bladder is inserted as the jig into the channel portion and the stacked prepreg is cured, an internal pressure is increased to allow the bladder to be inflated (expanded). Thus, the bladder maintains a state where the prepreg is stretched under tension to prevent the prepreg from being deformed (dented) between the band-shaped portions. At a time point when the prepreg has been cured into the skin, the internal pressure is lowered, and the bladder is contracted and drawn out of the channel portion. At this time, the band-shaped portions of the stringer are adhesively attached to and integrated with the inner surface of the skin. Therefore, it may be difficult to draw out a normal jig due to unevenness on the inner surface of the skin. However, at this time, the bladder has changed its state from the inflated state to the contacted state to have a smaller cross-section and has a flexibility, and therefore, the bladder can be easily drawn out of the channel portion without being affected by the unevenness.

The bladder has a function similar to that of an inflatable mandrel. An exemplary inflatable mandrel has a configuration in which the mandrel is composed of plural layers and has a cylindrical bag shape inflatable and contractible, as disclosed in Patent Literature 1. In this configuration, during molding, the mandrel is inflated and serves as an inner mold (core) with respect to an outer mold. In the contracted state, the mandrel is easily inserted into a cavity of the outer mold, and is easily drawn out of a molded drum-shaped object. For example, Patent Literature 2 discloses a manufacturing technique of a racket using the inflatable mandrel as a specific manufacturing technique using the inflatable mandrel. Patent Literature 3 discloses a technique for manufacturing a spar of a rotary wing aircraft using the inflatable mandrel.

CITATION LISTS

Patent Literature

Patent Literature 1: U.S. Patent Publication No. 4632328
Patent Literature 2: Japanese Laid-Open Patent Application Publication No. Hei. 8-000770
Patent Literature 3: U.S. Patent Publication No. 5939007

SUMMARY OF THE INVENTION

Technical Problem

The present inventors studied intensively in the course of manufacturing the stiffened panel using the hat stringer. As a result, it has been revealed that when the bladder similar to the general inflatable mandrel is used, there is a tendency that the skin is deformed easily and durability of the bladder decreases easily in manufacturing steps.

To be specific, as disclosed in Patent Literature 1 or Patent Literature 2, the general inflatable mandrel is used as an inner mold during molding. Therefore, what is needed is to control a degree (extent) of inflation of the mandrel so that a specified cavity is formed between an outer mold and the inner mold. By comparison, the bladder used as the jig of the hat stringer is required to function as a mold defining a stretched state of the prepreg with respect to the stringer during autoclave treatment, and function as a "backing member" for preventing the prepreg from being deformed when the prepreg is stacked on the outer periphery of the stiffener before the autoclave treatment.

To be specific, the prepreg is stacked on the outer periphery of the stiffener using an auto stacking machine including a stacking roller. On the outer periphery of the stiffener, the side surface of the bladder inserted into the channel portion of the stringer as well as the surfaces of the band-shaped portions of the stringer, is exposed. If the stacking roller presses the outer surface of the prepreg before being stacked to prevent occurrence of "wrinkles" or "concave-convex portions" when the prepreg is stacked on the outer periphery having such a configuration, the side surface of the bladder which is in contact with the inner surface of the prepreg as the "backing member" is deformed inwardly by a pressing force applied by the stacking roller. This results in problems that deformation such as "undulation" occurs in the prepreg, a stacked position of the prepreg is displaced, and a void is generated between layers of the prepreg which are not adhesively attached to each other (unoccupied by material) due to a lowered stacking pressure. The problem associated with stacking of the prepreg causes deformation or decreased strength of the cured skin, etc. Therefore, this problem may possibly impede improvement of a quality of the stiffened panel.

The bladder is inflated and contracted in repetition during use. Further, the bladder is used under heated and pressurized atmosphere, i.e., within the autoclave. Therefore, the bladder is designed so as to withstand a load associated with a change in the inflation and contraction, and a load associated with heating and pressurization. However, the fact that the side surface of the bladder is deformed easily due to external forces in manufacturing steps, such as the pressing force applied by the stacking roller, means that the bladder is applied with unexpected external forces. Because of this, durability of the bladder decreases, and the number of use of the bladder is limited.

Patent Literature 3 discloses a configuration in which a rigid structure is placed inside an impervious bladder constituting a mandrel assembly (e.g., see FIGS. 7d and 7e in Patent Literature 3). The rigid structure serves to maintain the outer shape of the mandrel assembly before it is inflated. Patent Literature 3 discloses that polystyrene foam which is contracted with a temperature increase is preferable as the rigid structure. Patent Literature 3 also discloses that if a composite spar is cured by heating, the rigid structure is contracted about 10%, and therefore, the mandrel assembly is taken out easily from inside the composite spar (e.g., FIGS. 9a and 9b in Patent Literature 3). In other words, the mandrel assembly disclosed in Patent Literature 3 can be used only once if it is intended to maintain the outer shape before heating. Or, it becomes necessary to change the internal rigid structure every time even if it can be used several times.

The manufacturing step disclosed in Patent Literature 3 fundamentally supposes the use of the inner mold (core), and does not suppose the use of "backing member" of the above stated bladder. Therefore, even if the rigid structure disclosed in this literature is employed, decrease in the durability of the bladder cannot be solved fundamentally.

The present invention is directed to solving the above mentioned problem, and an object of the present invention is to provide a bladder-type jig which is suitably used to manufacture a stiffened panel structure using a hat stringer, among composite material structures, can suppress deformation of prepreg effectively, and can implement durability which enables repeated use.

To achieve the above objective, according to the present invention, there is provided a jig used for manufacturing a composite material structure, the jig being inserted into a channel portion of a hat stringer and used, when the composite material structure is manufactured by attaching prepreg to a frame structure including the hat stringer as a frame member, the channel portion extending in a lengthwise direction of the hat stringer, the jig comprising: a body having a pipe shape and made of an elastic material, the body having a trapezoidal shape in which a transverse cross-section perpendicular to a lengthwise direction of the body has an upper base and a lower base longer than the upper base; wherein an interior of the body is tightly sealed, and the body has on one end portion thereof, a pressurization hole for pressurizing the interior of the body to inflate the body; and the body has thickened edge portions in which both base angle portions of at least the lower base are greater in thickness than another wall portions, among four corner portions in the transverse cross-section of the trapezoidal shape.

As described above, the bladder for use as the jig of the hat stringer functions similarly to a known inflatable mandrel. However, since an outer mold is present outside of the inflatable mandrel, what is needed is that the mandrel is inflated from inward to outward. By comparison, the bladder is required to be inflatable and have a stiffness so that the bladder is not deformed by a force externally applied in a normal state. The stiffness in the normal state is regarded as the very antithesis of the inflatable mandrel which is inflatable and contractible and is deformed easily. Through intensive study, the present inventors discovered the above stated configuration in which the thickened edge portions are provided at both side surfaces of a lower base wall portion corresponding to at least the lower base, among the four corner portions of the body in the transverse cross-section of the trapezoidal shape.

In accordance with the above configuration, to prevent the side wall of the body from being deformed, the thickened edge portions are provided at both base angle portions of at least the lower base. The thickened edge portions serve as angle braces supporting the lower base wall portion from inward. Therefore, the lower base wall portion is supported favorably from inward by oblique side wall portions corresponding to oblique sides of the transverse cross-section of the trapezoidal shape and the thickened edge portions. As a result, the lower base wall portion can be suppressed effectively from being deformed without impeding inflation of the body. Thus, opposing properties, i.e., inflatability and a stiffness of the body during the normal state can be achieved. Note that if the thickened edge portions are also provided at both base angle portions of the upper base, the shape of the body can be maintained more easily.

In the jig used for manufacturing the composite material structure having the above configuration, in addition to the above configuration, a wall portion corresponding to the lower base in the transverse cross-section of the body preferably has a shape which increases in thickness from a center portion thereof toward the both base angle portions, or the wall portion corresponding to the lower base preferably has a shape which increases in thickness such that a contour of a hollow space of a transverse cross-section of the wall portion draws a curve from the center portion thereof which is flat toward the both base angle portions.

In accordance with this configuration, it is possible to prevent a stress from concentrating on a portion of the inner surface of the body. This makes it possible to effectively suppress the lower base wall portion from being deformed, and improve durability of the jig.

In addition to the above configuration, the jig used for manufacturing the composite material structure preferably further comprises a coating film covering an outer peripheral surface of the body. A typical example of the coating film is a fluorine-contained resin film.

In accordance with this configuration, the coating film can further improve durability of the jig. By covering the outer peripheral surface of the body with the film made of a material which provides less surface tackiness, such as the fluorine-contained resin film, the jig can be drawn out of the channel portion of the hat stringer more easily. Moreover, depending on the kind of the film, a stiffness of the lower base wall portion can be enhanced.

In addition to the above configuration, the jig used for manufacturing the composite material structure preferably further comprises a tubular fiber-reinforced member embedded in a hollow space of the body on an inner surface side.

In accordance with this configuration, since the tubular fiber-reinforced member is embedded in the inner surface side, the stiffness of the inner surface side of the body can be improved. Since the fiber-reinforced member is stretchable and contractible, the stiffness of the body can be improved without impeding inflation of the body. Because of this, by covering the body with the coating film and providing the tubular fiber-reinforced member, durability of the jig can be further improved.

The jig used for manufacturing the composite material structure having the above configuration, further comprises sealing members for sealing both ends of the body; and one of the sealing members may be made of metal and may be provided with the pressurization hole; and the other of the sealing members may be made of an elastic material.

In accordance with this configuration, the interior of the body is sealed by the sealing members separate from the body. Since one of the sealing members which is provided with the pressurization hole is made of metal, the pressurization hole can be maintained surely. Since the other sealing member is made of the elastic material, damage to lengthwise bendability of the jig, softening property of the jig, flexibility of the jig, etc., can be avoided. Moreover, since the other sealing member is made of the elastic material, the jig for the composite material structure can be easily drawn out of the bladder after the composite material structure is cured.

In the jig used for manufacturing the composite material structure having the above configuration, the elastic material which is the material of the body is not particularly limited. A heat-resistant rubber composition material is preferably used. Examples of the heat-resistant rubber composition material are silicone rubber composition material, fluorine-contained rubber composition material, etc.

The above and further objects, features and advantages of the present invention will more fully be apparent from the following detailed description of preferred embodiments with accompanying drawings.

Advantageous Effects of the Invention

As described above, in accordance with the present invention, the jig used for manufacturing the composite material structure is suitably used for manufacturing a stiffened panel structure using the hat stringer. The present invention has an advantage that deformation of the prepreg can be suppressed effectively, and durability of the jig can be improved so that repeated use of the jig is achieved.

Figure 1A:
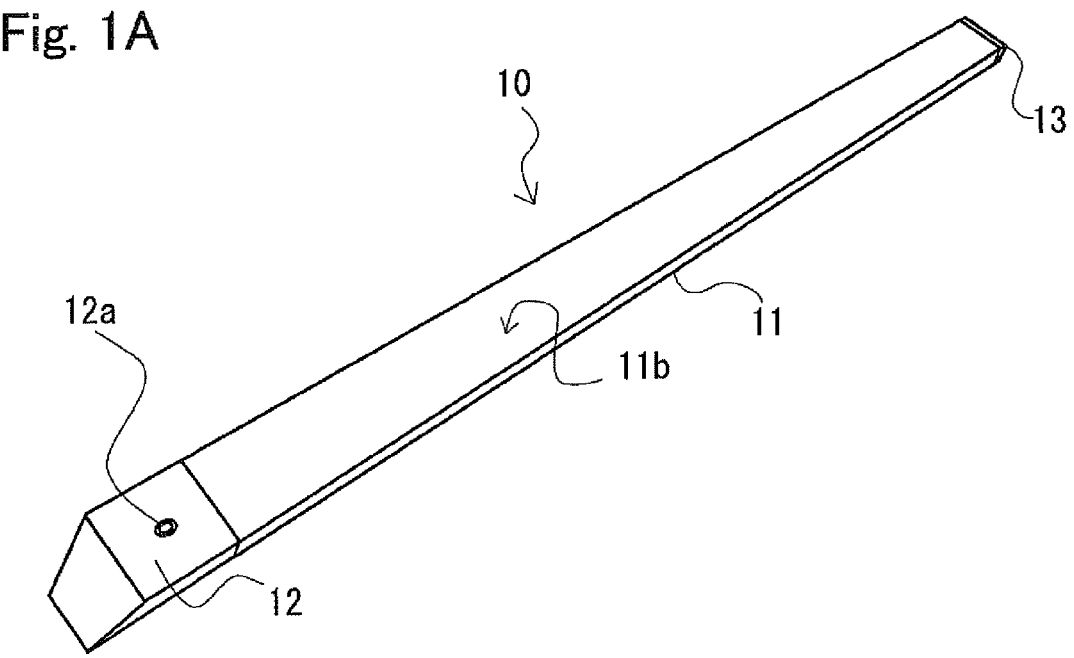
FIGS. 1A and 1B are schematic perspective views showing an exemplary external appearance configuration of a bladder as a jig used for manufacturing a composite material structure, according to Embodiment 1 of the present invention.

REFERENCE SIGNS LISTS 10 bladder (jig used for manufacturing a composite material structure)
11 body
11a contact wall portion (wall portion corresponding to upper base of trapezoidal-shaped transverse cross-section)
11b exposed wall portion (wall portion corresponding to lower base of trapezoidal-shaped transverse cross-section)
11c thickened edge portion (base angle portion, side edge portion)
12 terminal metal member (metal-made sealing member)
12a pressurization hole
12b insertion portion
13 terminal plug (sealing member made of elastic material)
20 hat stringer
20a band-shaped portion
20b channel portion
30 prepreg

DESCRIPTION OF EMBODIMENTS

Hereinafter, preferred embodiments of the present invention will be described with reference to the drawings. Throughout the drawings, the same or corresponding components are designated by the same reference numerals and repetitive description thereof will not be given.

(Embodiment 1)

[Basic Configuration of Bladder as Jig Used for Manufacturing Composite Material Structure]

Figure 1B:
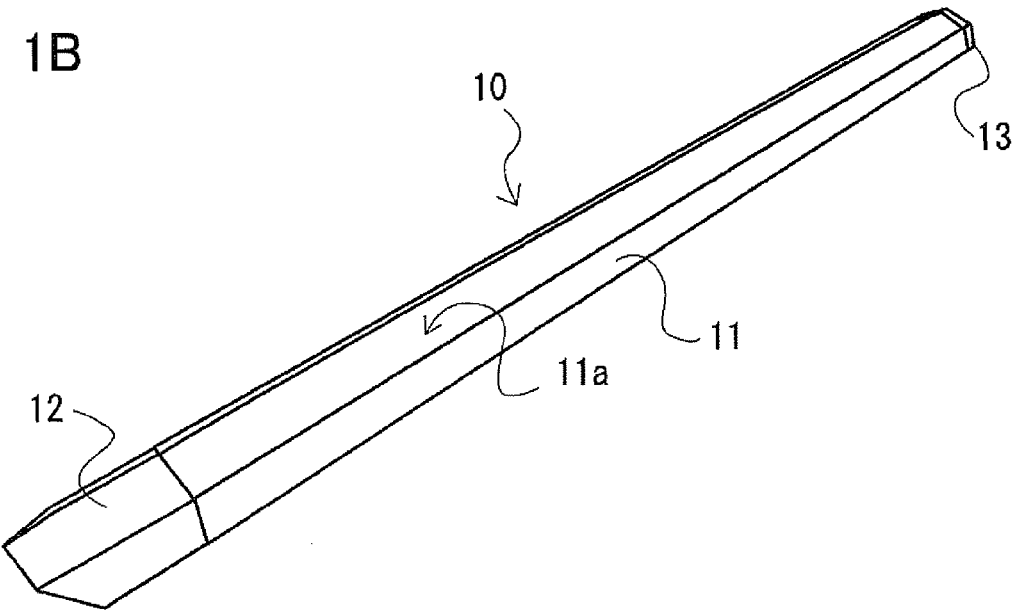
Figure 2A:
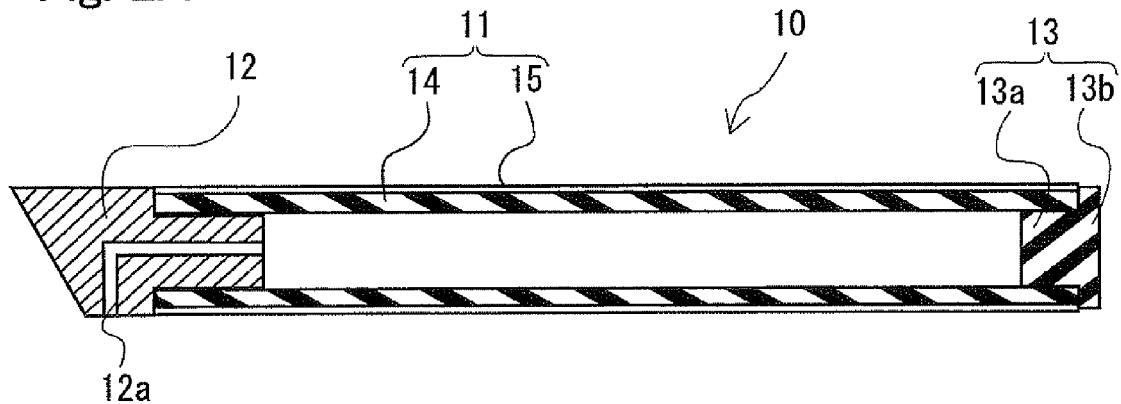
FIG. 2A is a cross-sectional view of the bladder of FIG. 1, in a lengthwise (longitudinal) direction.
Figure 2B:
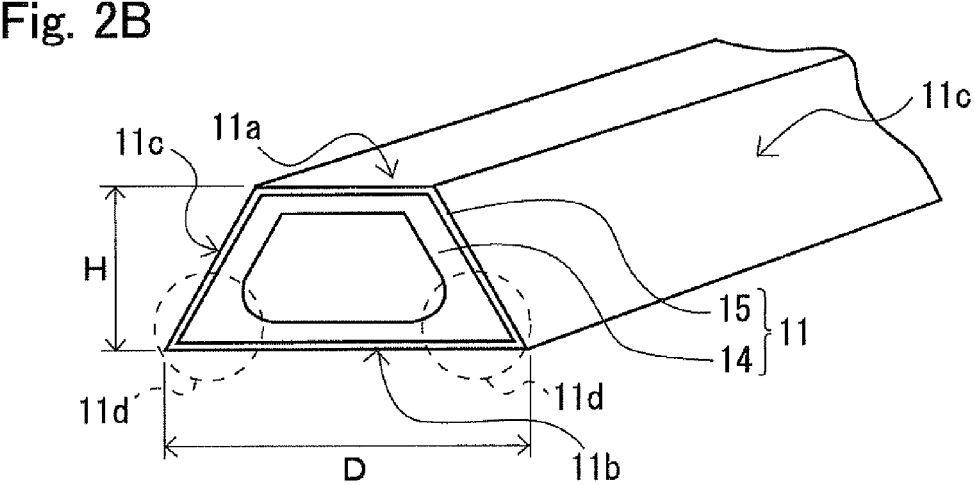
FIGS. 2B and 2C are perspective views showing exemplary structures of a body, a terminal metal member and a core member constituting the bladder of FIG. 2A.
Figure 2C:
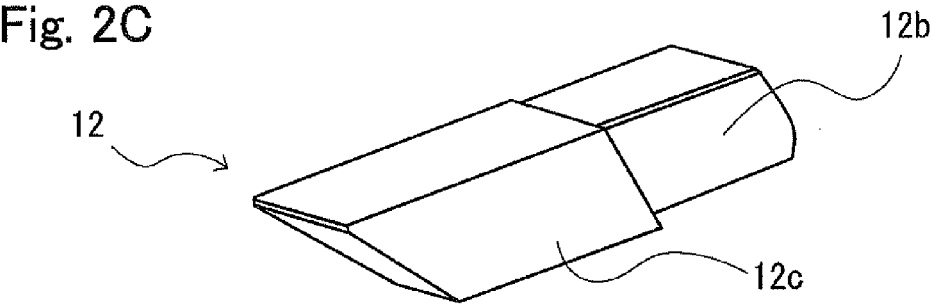

FIGS. 1A and 1B are schematic perspective views showing an exemplary external appearance configuration of a bladder as a jig used for manufacturing a composite material structure, according to the present embodiment of the present invention. FIG. 2A is a cross-sectional view of the bladder of FIG. 1, in a lengthwise direction. FIG. 2B is a partial perspective view showing a shape of a body of the bladder of FIG. 1. FIG. 2C is a perspective view showing a shape of a terminal metal member 12 attached to one end portion of the bladder of FIG. 1. Hereinafter, the lengthwise direction of the bladder is referred to as "longitudinal direction," and a direction perpendicular to the longitudinal direction is referred to as "transverse direction." A cross-section in the longitudinal direction of the bladder is referred to as "longitudinal cross-section," and a cross-section of the bladder in the transverse direction is referred to as "transverse cross-section."

As shown in FIGS. 1A and 1B, a bladder 10 according to the present embodiment has a columnar shape in its overall external appearance. The bladder 10 includes at least a body 11, a terminal metal member 12, and a terminal plug 13. The body 11 is a member which becomes the body of the bladder 10, and has a hollow pipe shape as shown in FIGS. 2A and 2B.

As shown in FIG. 2B, the body 11 has a transverse cross-section of a trapezoidal-shape having an upper base and a lower base longer than the upper base. As described later, the bladder 10 conforms in shape to a channel portion formed on the hat stringer into which the bladder 10 is inserted. A wall portion of the body 11 which corresponds to the upper base of the trapezoidal-shaped transverse cross-section is referred to as "contact wall portion 11a" in the present embodiment, as shown in FIGS. 1B and 2B, because the outer surface of the wall portion contacts the channel portion of the hat stringer. A wall portion of the body 11 which corresponds to the lower base of the trapezoidal-shaped transverse cross-section is referred to as "exposed wall portion 11b" in the present embodiment, as shown in FIGS. 1A and 2B, because the outer surface of the wall portion is exposed in a state where the bladder 10 is inserted into the channel portion of the hat stringer. Therefore, FIG. 1A is a perspective view showing a state where the exposed wall portion 11b is the upper side, while FIG. 1B is a perspective view showing a state where the contact wall portion 11a is the upper side. Of course, the contact wall portion 11a (wall portion corresponding to the upper base) and the exposed wall portion 11b (wall portion corresponding to the lower base) which face each other are parallel to each other.

As shown in FIG. 2B, in the present embodiment, the transverse cross-section of the body 11 has a trapezoidal-shape, to be precise, an isosceles-trapezoidal shape, which is symmetric with respect to a line segment passing through a center point of the upper base and a center point of the lower base. When wall portions of the body 11, corresponding to oblique sides (lines) of the trapezoidal-shaped transverse cross-section, are inclined wall portions 11c, respectively, the inclined wall portions 11c are inclined in opposite directions with an equal inclination angle. The outer surfaces of the inclined wall portions 11c are surfaces contacting the channel portion of the hat stringer, like the contact wall portion 11a.

In the present embodiment, as shown in FIG. 2B, the height of the trapezoidal-shaped transverse cross-section is indicated by H, and the length (width of the exposed wall portion 11b) of the lower base of the trapezoidal-shaped transverse cross-section is indicated by D. In the present embodiment, the transverse cross-section of the body 11 has an isosceles-trapezoidal shape, but is not limited to this. If the transverse cross-section of the channel portion of the hat stringer has a non-isosceles-trapezoidal shape, the transverse cross-section of the body 11 may have a trapezoidal-shape conforming in shape to the non-isosceles-trapezoidal shape.

As shown in FIG. 2A, the body 11 is pipe-shaped and is sealed at both ends by the terminal metal member 12 and the terminal plug 13, respectively so that the body 11 has a sealed inner space. As shown in FIGS. 2A and 2B, the body 11 includes at least a pipe-shaped portion 14 formed of an elastic material, and a coating film 15 covering the outer peripheral surface of the pipe-shaped portion 14. The body 11 is substantially constituted by the pipe-shaped portion 14, except for the coating film 15 which is a surface layer. Therefore, the contact wall portion 11a, the exposed wall portion 11b, and the inclined wall portions 11c which are described above, are the wall portions of the body 11, and are the wall portion of the pipe-shaped portion 14.

The pipe-shaped portion 14 corresponds to "main body" of the body 11. As described later, when the interior of the body 11 is pressurized, the pipe-shaped portion 14 formed of the elastic material is inflated. The coating film 15 covering the outer peripheral surface of the pipe-shaped portion 14 is stretchable according to the inflation of the pipe-shaped portion 14. Therefore, the body 11 is entirely inflated by pressurizing the interior thereof. Specific shape and dimension of the transverse cross-section of the body 11, specific configuration of the pipe-shaped portion 14, and specific configuration of the coating film 15, etc., will be described later.

The overall length of the body 11 is not particularly limited. As described later, the bladder 10 of the present embodiment is used as a jig used for manufacturing a composite material structure, and is inserted into each of channel portions of a plurality of hat stringers for use as frame members of the composite material structures. Therefore, the body 11 is designed to have various lengths. For example, when the composite material structure is a body of aircraft formed as a one piece barrel (OPB), the length of the hat stringer may be set to fall within a range of 1~14 m. Therefore, the length of the body 11 may be set to fall within a range of 1~14 m, to conform to the length of the hat stringer.

The terminal metal member 12 is a member for sealing one end portion of the body 11. As shown in FIGS. 1A and 2A, the terminal metal member 12 has a pressurization hole 12a. In the present embodiment, as shown in FIG. 2C, the terminal metal member 12 includes at least an insertion portion 12b inserted into a hollow space of the body 11 and a head portion 12c connected to the insertion portion 12b. The insertion portion 12b is adhesively attached to the inner surface of the body 11 by an adhesive agent in a state where the terminal metal member 12 is inserted into the body 11. The head portion 12c is exposed to outside in a state where the terminal metal member 12 is inserted into the body 11.

The insertion portion 12b may conform in shape to the hollow space of the body 11. In the present embodiment, as shown in FIG. 2B, the wall portions of the body 11 have an equal thickness, and therefore, the transverse cross-section of the hollow space has a trapezoidal shape. Therefore, the insertion portion 12b has a short columnar shape in which the transverse cross-section has a trapezoidal shape. The length of the insertion portion 12b is not particularly limited. The length of the insertion portion 12b may ensure a sufficient contact area to maintain the sealed state of the interior of the body 11 in a state where the insertion portion 12b is inserted into the hollow space of the body 11 and adhesively attached to the inner surface of the body 11. In the present embodiment, the length of the insertion portion 12b is within a range of, for example, 50~70 mm.

By comparison, the head portion 12c may have a shape having a dimension sufficiently greater than a dimension of the hollow space of the body 11 so that the head portion 12c can be surely exposed to outside of the body 11. As described later, the transverse cross-section of the head portion 12c is preferably substantially equal to a dimension of the outer shape of the body 11 so that the bladder 10 is easily inserted into the channel portion of the hat stringer. In this way, if the transverse cross-section of the head portion 12c is substantially equal in size to the transverse cross-section of the body 11, then the outer surfaces of the respective wall portions of the bladder 10 are substantially the same flat surfaces, to allow the bladder 10 to be inserted into and drawn out of the channel portion more easily.

In the present embodiment, the outer end of the head portion 12c of the terminal metal member 12 is not flat but is an inclined surface protruding. To be specific, when the surface of the terminal metal member 12, corresponding to the contact wall portion 11a, is a contact surface, and the surface of the terminal metal member 12, corresponding to the exposed wall portion 11b, is an exposed surface, in a state where the terminal metal member 12 is attached to the body 11, the contact surface of the terminal metal member 12 is flat and the exposed surface is inclined toward the contact surface as shown in FIG. 2C. This allows the outer end surface of the terminal metal member 12 to be an inclined surface. Although not shown, the contact surface may have a width decreasing toward the outer end and its outer end may be pointed. If the outer end of the head portion 12c is the inclined surface (or pointed surface), the bladder 10 is easily drawn out of the channel portion of the hat stringer into which the body 11 is inserted. But, the shape of the head portion 12c is not limited to this shape. The shape of the terminal metal member 12 is not limited to the above configuration in which it includes the insertion portion 12b and the head portion 12c, but may be configured to include another constituent.

As shown in FIGS. 1A and 2A, the terminal metal member 12 has a structure in which one opening of the pressurization hole 12a is formed on the exposed surface of the head portion 12c, and the other opening of the pressurization hole 12a is formed on the end surface of the insertion portion 12b. In FIG. 2C, the exposed surface of the terminal metal member 12 is at a lower side and therefore the pressurization hole 12a is not depicted. The pressurization hole 12a is configured to extend substantially vertically from one opening formed on the exposed surface of the head portion 12c toward an inside of the head portion 12c, then is bent in a substantially center of the head portion 12c toward the insertion portion 12b, and further extends to the opening formed on the end surface of the insertion portion 12b. Therefore, in a state where the bladder 10 is inserted into the channel portion of the hat stringer, one opening of the pressurization hole 12a is exposed in the exposed surface of the head portion 12c of the terminal metal member 12, and the other opening of the pressurization hole 12a is connected to a hollow space of the body 11. Therefore, the pressurization hole 12a is an air passage which provides communication between inside of the body 11 and outside of the body 11, and can pressurize the interior of the body 11 sealed tightly. For example, in the interior of an autoclave in a high-pressure atmosphere, the interior of the body 11 is placed in a high-pressure condition through the pressurization hole 12a, so that the interior of the body 11 sealed tightly is pressurized and hence inflated.

In the present embodiment, as a material of the terminal metal member 12, aluminum or alloy of aluminum is used. But, the material of the terminal metal member 12 is not limited this. Since the bladder 10 is used as the jig, the terminal metal member 12 is preferably made of a material having a smallest possible weight. In addition, the terminal metal member 12 is preferably made of a material which allows the pressurization hole 12a to be formed easily inside and its shape to be maintained easily. In view of this and to achieve cost saving, in the present embodiment, aluminum or alloy of aluminum is suitably used as the material of the terminal metal member 12. Depending on manufacturing conditions of a composite material structure, conditions other than "lightweight" may be sometimes considered as important. Therefore, for example, a known metal material other than aluminum, ceramic, or a heat-resistant resin composition material, may be selected, or a composite material of metals, ceramic, or heat-resistant resin composite materials may be used.

The terminal plug 13 is a member for tightly sealing the other end portion (end portion on the opposite side of the end portion sealed by the terminal metal member 12) of the body 11. In the present embodiment, as shown in FIG. 2A, the terminal plug 13 includes an insertion portion 13a inserted into the hollow space of the body 11, and an outer 11d portion 13b connected to the insertion portion 13a.

Like the insertion portion 12b of the terminal metal member 12, the insertion portion 13a of the terminal plug 13 has a short-column shape with a transverse cross-section of a trapezoidal-shape to conform in shape to the transverse cross-section of the hollow space of the body 11, while the outer 11d portion 13b has a plate shape in which its outer diameter is substantially equal to the outer diameter of the body 11. Like the insertion portion 12b of the terminal metal member 12, the length of the insertion portion 13a is not particularly limited, but may be a length for ensuring a sufficient contact area so that the interior of the body 11 is maintained in a sealed condition in a state where the insertion portion 13a is inserted into the hollow space of the body 11 and is adhesively attached to the inner surface of the body 11 by an adhesive agent. In the present embodiment, the length of the insertion portion 13a is within a range of, for example, 20~30 mm.

A specific shape of the terminal plug 13 and specific dimensions of the constituents of the terminal plug 13 are not limited to the above configuration. For example, the terminal plug 13 may be configured to include constituents other than the insertion portion 13a and the outer 11d portion 13b as necessary. Or, the outer 11d portion 13b may have a shape other than the plate shape so long as the terminal plug 13 can tightly seal the interior of the body 11.

As the material of the terminal plug 13, metal or the like may be used like the terminal metal member 12. An elastic material is preferably used for the terminal plug 13, because, for example, the terminal plug 13 need not stably maintain a pressurization hole unlike the terminal metal member 12 required to maintain the pressurization hole 12a, and will become the rear end of the bladder 10 when the bladder 10 is drawn out after the bladder 10 is inserted into the channel portion of the hat stringer and used.

The kind of the elastic material is not particularly limited, but the material may have flexibility for allowing the interior of the body 11 to be sealed tightly, and have heat resistance. For example, heat-resistant rubber composition material is preferably used. As the heat-resistant rubber composition material, there are silicone rubber composition material, fluorine-contained rubber composition material, etc., which is also used as the material of the pipe-shaped portion 14. The detail of these materials will be described later in conjunction with the material of the body 11. The pipe-shaped portion 14 and the terminal plug 13 may be molded using a heat-resistant rubber composition material having the same composition, or may be molded using heat-resistant rubber composition materials different from each other to meet requirements of different physical properties (the pipe-shaped portion 14 is required to have inflatability but the terminal plug 13 is not).

As described above, in the present embodiment, the body 11 is sealed by two kinds of sealing members which are the terminal metal member 12 and the terminal plug 13. Of course, the present invention is not limited to this. The body 11 may be sealed by sealing members which are both made of the resin composition materials. Instead of using separate members which are the sealing members, the pipe-shaped body 11 may be secondarily molded to seal openings at its both ends. In either case, the stable pressurization hole 12a may be formed on one of the terminal metal member 12 and the terminal plug 13.

[Specific Configuration of Body of Bladder]

Figure 3A:
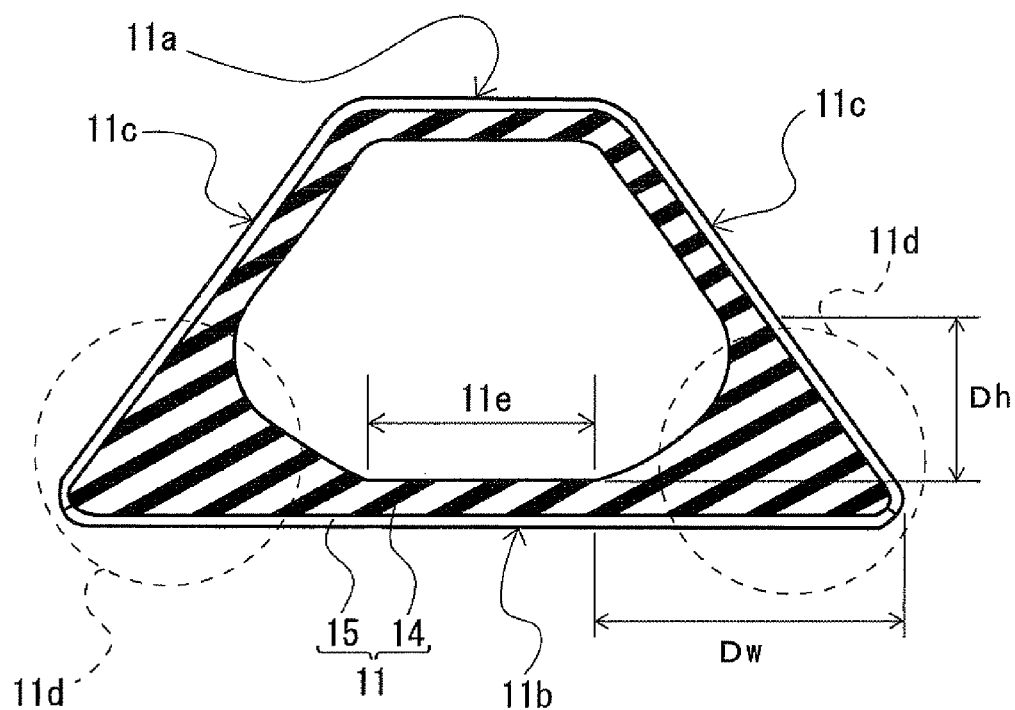
FIG. 3A is a schematic cross-sectional view showing a configuration of a transverse cross-section of the body of FIGS. 2A and 2B.
Figure 3B:
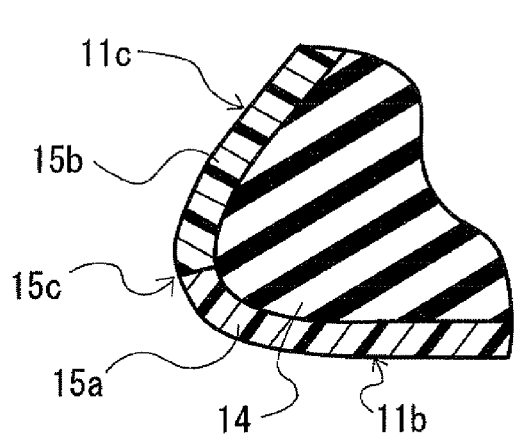
FIG. 3B is a partial cross-sectional view showing a region in the vicinity of one side edge portion of an exposed wall portion, in the transverse cross-section of the body of FIG. 3A.
Figure 3C:
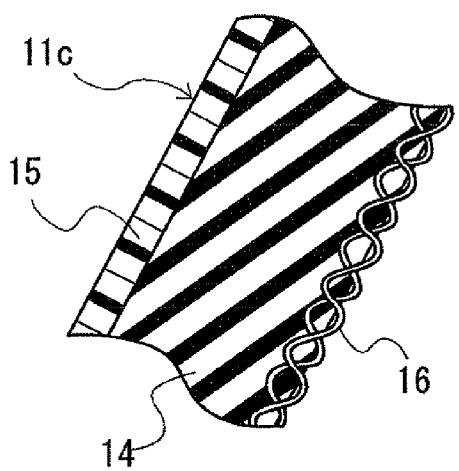
FIG. 3C is a partial cross-sectional view showing only an inclined wall portion, in the transverse cross-section of the body of FIG. 3A.

Next, the body 11 of the bladder 10 of the present embodiment will be described with reference to FIGS. 1A and 1B, FIGS. 2A~2C, and FIGS. 3A and 3B. FIG. 3A is a schematic cross-sectional view showing a configuration of a transverse cross-section of the body 11 of FIGS. 2A and 2B, FIG. 3B is a partial cross-sectional view showing a region in the vicinity of one side edge portion of the exposed wall portion 11b, in the transverse cross-section of the body 11 of FIG. 3A, and FIG. 3C is a partial cross-sectional view showing only the inclined wall portion 11c, in the transverse cross-section of the body 11 of FIG. 3A.

As described above, the body 11 includes at least the pipe-shaped portion 14 having a transverse cross-section of a trapezoidal-shape, and the coating film 15 covering the outer peripheral surface of the pipe-shaped portion 14. As shown in FIGS. 2B and 3A, the exposed wall portion 11b of the pipe-shaped portion 14 is provided with thickened edge portions 11d, at both side edges. The exposed wall portion 11b is the wall portion (lower base wall portion) corresponding to the lower base in the transverse cross-section of a trapezoidal-shape. Therefore, portions corresponding to both end portions of the lower base are the thickened edge portions 11d, respectively.

The thickened edge portions 11d correspond to the both base angles of the lower base in the transverse cross-section of a trapezoidal-shape, respectively. The thickened edge portions 11d are both side edge portions of the exposed wall portion 11b, and are side edge portions of the inclined wall portions 11c, on the exposed wall portion 11b side. Therefore, the thickened edge portions 11d respectively correspond to portions at which the exposed wall portion 11b is joined to the inclined wall portions 11c.

The thickened edge portions 11d do not only function as the portions at which the exposed wall portion 11b is joined to the inclined wall portions 11c, but also function like angle braces for supporting the exposed wall portion 11b with respect to the inclined wall portions 11c. For example, assuming that the lower base in the transverse cross-section of a trapezoidal-shape is the upper side (i.e., the transverse cross-section of the body 11 shown in FIG. 3A is reversed in the vertical direction), the exposed wall portion 11b is supported at both ends by the pair of the inclined wall portions 11c. In a structure in which the thickened edge portions 11d are not provided (conventional structure), each of the portions at which the exposed wall portion 11b is joined to the inclined wall portions 11c has a shape in which two plate members are merely joined together at a side edge so as to form an acute angle. By comparison, in a structure in which the thickened edge portions 11d are provided like the present embodiment, assuming that the exposed wall portion 11b and the inclined wall portions 11c are "columns" crossing each other to form an acute angle, the thickened edge portions 11d serve as "angle braces" provided between these columns.

When a force is applied to the outer surface of the exposed wall portion 11b, the thickened edge portions 11d serve to maintain a good positional relationship between the exposed wall portion 11b and the inclined wall portions 11c. Because of this structure, the exposed wall portion 11b is suppressed from being displaced with respect to the inclined wall portions 11c and hence the exposed wall portion 11b is suppressed effectively from being deformed inwardly (inward deformation).

According to another aspect of the function of the thickened edge portions 11d, the thickened edge portions 11d form support surfaces which support the both end portions of the exposed wall portion 11b which is a flat plate from inward. That is, in the conventional structure, the both ends of the exposed wall portion 11b are supported by linear "surfaces" which are side edge portions of the inclined wall portions 11c. However, the thickened edge portions 11d support the exposed wall portion 11b by expanded "surfaces" from inward. Without the thickened edge portions 11d, the exposed wall portion 11b is supported at both ends by the portions at which the exposed wall portion 11b is joined to the inclined wall portions 11c, and the portions at which the exposed wall portion 11b is joined to the inclined wall portions 11c are merely the "linear support surfaces" corresponding to the thickness of the inclined wall portions 11c. By comparison, because of the presence of the thickened edge portions 11d, the exposed wall portion 11b is supported at both ends by the "linear support surfaces," and by "band-shaped support surfaces" corresponding to the thickness of the thickened edge portions 11d from inward. Because of this, a center portion 11e of the exposed wall portion 11b shown in FIG. 3A is less likely to be deformed. As a result, the exposed wall portion 11b is suppressed from being deformed inwardly even when a force is applied to the outer surface of the exposed wall portion 11b.

The shape of the thickened edge portions 11d is not particularly limited. The thickened edge portions 11d may be configured to have an increased thickness so that they serve as at least "angle braces" or "band-shaped support surfaces" as described above. In the present embodiment, for example, as shown in FIG. 3A, the thickened edge portions 11d are formed in the exposed wall portion 11b as side edge portions having a shape which increases in thickness in an inward direction continuously from the center portion 11e thereof. In other words, the exposed wall portion 11b including the thickened edge portions 11d has a shape which increases in thickness from the center portion 11e of the exposed wall portion 11b toward the both side edge portions. Therefore, as shown in FIG. 3A, the contour of the inner surface of the exposed wall portion 11b is a substantially curved surface like a circular-arc-shape greatly curved outward of the body 11 in a convex shape, as a whole.

Since the thickened edge portions 11d are provided at both side edge portions of the exposed wall portion 11b as having a shape whose thickness increases continuously, a stress is less likely to concentrate on a portion of the inner surface of the exposed wall portion 11b when a force is applied to the outer surface of the exposed wall portion 11b. Therefore, even when a force is applied to the outer surface of the exposed wall portion 11b, the exposed wall portion 11b can be suppressed effectively from being deformed inwardly, and durability of the exposed wall portion 11b can be prevented from decreasing.

The contour of the inner surface of the exposed wall portion 11b may have a single circular-arc shape, but may have a shape in which plural kinds of line segments are connected together to form a circular-arc as a whole, for example, a shape in which curved lines are connected to both ends of a straight line. To be specific, in the present embodiment as shown in FIG. 3A, the outer and inner surfaces of the center portion 11e of the exposed wall portion 11b are flat and the exposed wall portion 11b has a thickness increasing from the flat center portion 11e toward the both side edge portions thereof to form curves bent inward. Since the contour of the transverse cross-section of the exposed wall portion 11b has such a shape, the thickened edge portions 11d have curved inner surfaces, respectively, which are connected to the flat center portion 11e.

Since the thickened edge portions 11d have curved inner surfaces as described above, the portions at which the flat center portion 11e is joined to the thickened edge portions 11d can be thinned and the overall exposed wall portion 11b can be made lightweight, as compared to a structure in which the thickened edge portions 11d are formed such that the inner surface of the exposed wall portion 11b has a single circular-arc shape. As described above, the length of the bladder 10 is preferably within a range of 1~14 m. Therefore, as the weight of the bladder 10 increases, its weight increases, and the bladder 10 is treated less easily. Therefore, if the weight of the bladder 10 is minimized, it can be handled more easily. In addition, since the inner surface of the portion at which the flat center portion 11e is connected to the thickened edge portion 11d is formed not to have an angle with which a stress tends to concentrate there, it is possible to prevent the exposed wall portion 11b from decreasing its durability.

In the present embodiment, the inner surface of the thickened edge portion 11d has a shape in which plural curved surfaces are connected together, although it may be a single curved surface. To be specific, the inner surface of the thickened edge portion 11d includes a first curved inner surface contacting the inner surface of the inclined wall portion 11c and a second curved inner surface extending from the first curved inner surface and contacting the center portion 11er of the exposed wall portion 11b. The first curved inner surface has a smaller diameter than the second curved inner surface. For example, when the first curved inner surface has a diameter of R=8 mm, the second curved inner surface has a diameter of R=35 mm.

Assuming that the thickened edge portions 11d are angle braces, the inclined wall portions 11c support the inner surface of the exposed wall portion 11b via the thickened edge portions 11d as the angle braces. That is, preferably, the thickened wall portion as the angle brace is configured to have a great angle with respect to the inner surface of the inclined wall portion 11c, to allow the thickened wall portion to be close to a substantially vertical state with respect to the inner surface of the inclined wall portion 11c and to have a relatively small angle with respect to the inner surface of the exposed wall portion 11b to allow the thickened wall portions to support a wider portion of the inner surface of the exposed wall portion 11b.

When the thickened wall portion as the angle brace is configured to have a flat surface which is close to a substantially vertical state with respect to the inner surface of the inclined wall portion 11c and a flat surface having a smaller angle with respect to the inner surface of the exposed wall portion 11b, it is configured to have a "bent point" on which a stress tends to concentrate. To prevent the stress from concentrating, all of the inner surfaces of the connection portions of the respective wall portions are preferably curved surfaces. Because of this, in the present embodiment, the thickened edge portion 11d has the first curved inner surface and the second curved inner surface. Since the second curved inner surface is a gently curved surface which is an almost flat surface in the whole transverse cross-section of the body 11, a flat surface may be used instead of the second curved inner surface depending on the degree to which a stress is assumed to concentrate.

The inventors studied intensively to reduce a weight of the body 11 and improve a stiffness of the exposed wall portion 11b. As a result, the body 11 (pipe-shaped portion 14) of the present embodiment is configured such that the side wall portions of the exposed wall portion 11b are thickened instead of simply thickening the exposed wall portion 11b which should not be deformed inwardly.

The dimension of the thickened edge portion 11d is not specifically limited, but is suitably set according to a dimension of the whole bladder 10 of the present embodiment. The dimension of the bladder 10 is set according to a dimension of the hat stringer. The dimension of the hat stringer is set according to a specification of a composite material structure. Therefore, it may be said that the dimension of the thickened edge portion 11d is set according to the dimension of the hat stringer or the specification of the composite material structure.

In the present embodiment, as shown in FIG. 3A, the bladder 10 includes the flat center portion 11e in the exposed wall portion 11b, and has the first curved inner surface and the second curved inner surface in each of the thickened edge portions 11d. In accordance with this configuration, as the dimension of the thickened edge portion 11d, a maximum thickness Dh and a width Dw are set to suitable values, respectively. The maximum thickness Dh of the thickened edge portion 11d is defined as a maximum thickness in a normal line direction with respect to the inner surface of the flat center portion 11e. The width Dw of the thickened edge portion 11d is defined as a width which provides a wall thickness by forming the first curved inner surface and the second curved inner surface at the corner of the exposed wall portion 11b. In other words, the width Dw of the thickened edge portion 11d is defined as a width from the edge of the exposed wall portion 11b to the center portion 11e of the exposed wall portion 11b.

For example, preferable dimension of the thickened edge portion 11d of the present embodiment can be expressed as a percentage on the basis of the dimension of the bladder 10. For example, the maximum thickness Dh of the thickened edge portion 11d is preferably within a range of 40~55% of a height H (see FIG. 28) of the transverse cross-section of the bladder 10, and more preferably within a range of 44~52% of the height H of the transverse cross-section of the bladder 10. The width Dw of the thickened edge portion 11d is preferably within a range of 30~40% of the entire width D of the exposed wall portion 11b, and more preferably within a range of 35~37% of the entire width D of the exposed wall portion 11b.

A numeric value range of the dimension of the thickened edge portion 11d is preferably set when the specific dimension of the body 11 falls within a numeric value range as described later. Of course, the present invention is not particularly limited to these numeric value ranges.

In the present embodiment, the thickened edge portions 11d are provided at both side edge portions of the exposed wall portion 11b, i.e., only at both base angle portions of the lower base in the transverse cross-section of a trapezoidal-shape of the body 11. In addition, although not shown, the thickened edge portions 11d may also be provided at both side edge portions of the contact wall portion 11a, i.e., at both base angle portions of the upper base. In other words, the thickened edge portions 11d may be provided at all of four corner portions in the transverse cross-section of a trapezoidal-shape of the body 11. This can maintain a positional relationship between the contact wall portion 11a and the inclined wall portions 11c. As a result, the shape of the body 11 can be maintained well.

As described above, in the body 11, the thickened edge portions 11d may be provided at both side edge portions of the exposed wall portion 11b in the pipe-shaped portion 14. In the present embodiment, as shown in FIGS. 3A and 3B, the coating film 15 preferably covers the outer peripheral surface of the pipe-shaped portion 14. The coating film 15 can improve a strength of the body 11 and enhance durability of the bladder 10. Depending on the kind of the film, the stiffness of the body 11 can be enhanced, and the body 11 can be prevented from being deformed inwardly more effectively.

As described later, the pipe-shaped portion 14 is preferably made of a known silicone rubber composition material. A component made of the silicone rubber composition material typically has a surface having tackiness (adhesivity). Because of this, it is difficult to draw the bladder 10 out of the channel portion of the hat stringer in some cases, because of the tackiness of the outer peripheral surface of the pipe-shaped portion 14. Accordingly, by covering the outer peripheral surface of the pipe-shaped portion 14 with the coating film 15 made of a material having no tackiness, the bladder 10 can be drawn out more easily.

The coating film 15 may cover the outer surface of the pipe-shaped portion 14. A cover state of the coating film 15 is not particularly limited. For example, the entire outer periphery of the pipe-shaped portion 14 may be covered with a single coating film 15 or plural sheets of coating films 15. Or, a band-shaped coating film 15 may be wound around the outer periphery of the pipe-shaped portion 14 in a spiral shape. In the present embodiment, as shown in FIG. 3B, the outer peripheral surface of the pipe-shaped portion 14 is covered with the coating film 15a in the exposed wall portion 11b and covered with the coating film 15b in the contact wall portion 11a and the inclined wall portions 11c, and the end portion of the coating film 15a and the end portion of the coating film 15b are butted with each other at each of both side edge portions of the exposed wall portion 11b. The both side edge portions of the exposed wall portion 11b correspond to the both end angles of the lower base in the transverse cross-section of a trapezoidal-shape of the pipe-shaped portion 14, respectively. Therefore, a butted portion 15c of the coating films 15a and 15b is located at an apex of each of the both end angles of the lower base.

In a case where the two coating films 15a and 15b are butted with each other and bonded to the outer peripheral surface of the pipe-shaped portion 14, the butted portion 15c is preferably not located on the outer surface of the exposed wall portion 11b, at least, but is more preferably located at the both side edge portions of the exposed wall portion 11b like the present embodiment.

The butted portion 15c is a discontinuous portion of the coating film 15 in the overall coating film 15 covering the outer peripheral surface of the pipe-shaped portion 14. Therefore, when the butted portion 15c is located on the outer surface of the exposed wall portion 11b which contacts the prepreg in a state where the bladder 10 is inserted into the channel portion of the hat stringer, the outer shape of the discontinuous portion is transferred to the contact surface of the prepreg. Under this condition, the prepreg is cured. Therefore, if the butted portion 15c is not located on the outer surface of the exposed wall portion 11b, at least, the above undesired transfer of the outer shape can be prevented.

The butted portion 15c may be located on the surface of the contact wall portion 11a and the surfaces of the inclined wall portions 11c. Nonetheless, to easily draw out the bladder 10, the surface which contacts the inner surface of the channel portion of the hat stringer is as flat as possible. In a preferable manufacturing method of the body 11 as described later, dies are used. If the butted portion 15c is located on each of both side edge portions of the exposed wall portion 11b, an extra material of the pipe-shaped portion 14 can flow outward through the butted portion 15c. This makes it possible to effectively suppress the pipe-shaped portion 14 from being deformed inwardly.

In the body 11, as described above, the two coating films 15a and 15b may be butted with each other and bonded together, to cover the outer peripheral surface of the pipe-shaped portion 14. Or, three or more films may cover the outer peripheral surface of the pipe-shaped portion 14. In that case, these films are preferably bonded together such that the butted portion 15c is located at the end angle in the transverse cross-section of a trapezoidal-shape. Moreover, the end portions of the films may be bonded together such that they partially overlap with each other without abutting them so long as the drawing of bladder 10 out of the channel portion is not adversely affected.

When the coating film 15 is provided to allow the bladder 10 to be drawn out more easily in addition to the reinforcement of the pipe-shaped portion 14 from outside, it is preferably stacked on the outer peripheral surface of the pipe-shaped portion 14 without providing overlapping portions of the films, or unevenness such as "wrinkles," or "concave-convex portions" on its surface.

The body 11 is preferably configured such that the coating film 15 is stacked on the entire surface of the pipe-shaped portion 14 as described above, but may be configured such that the coating film 15 is not stacked on the pipe-shaped portion 14. In any configuration, the transverse cross-section of the body 11 may have a trapezoidal-shape conforming in shape to the channel portion of the hat stringer, and its dimension is not particularly limited. In the present embodiment, for example, the length of the upper base of the transverse cross-section, i.e., the width of the contact wall portion 11a is within a range of 15~25 mm, the length D of the lower base of the transverse cross-section, i.e., the width of the exposed wall portion 11b is within a range of 50~75 mm, and the height H of the transverse cross-section, i.e., a distance between the contact wall portion 11a and the exposed wall portion 11b in the body 11 is within a range of 20~37 mm. However, the dimensions of the transverse cross-section of the body 11 are not limited to these numeric value ranges, but are suitably set according to the shape of the channel portion of the hat stringer.

The thicknesses of the wall portions (contact wall portion 11a, exposed wall portion 11b and inclined wall portions 11c) of the body 11, are not particularly limited. The thicknesses are required to provide flexibility which allows the body 11 to be inflatable, although this depends on conditions such as a physical property of the elastic material of the pipe-shaped portion 14 and the degree to which the body 11 is pressurized during use. This is intended to inflate the interior of the body 11 by pressurization as described above.

In the present embodiment, as the elastic material constituting the pipe-shaped portion 14, a known silicone rubber composition material is preferably used, as described later.

Therefore, the thicknesses of the respective wall portions of the pipe-shaped portion 14 may be within a range of 2.0~6.0 mm. If the thicknesses of the respective wall portions of the pipe-shaped portion 14 are within this range, the pipe-shaped portion 14 can be inflated sufficiently under pressurizing conditions described below, although it depends on a monomer structure or average molecular weight of silicone elastomer which is a major component of the silicone rubber composition material, or the kinds or composition of the components of the silicone rubber composition material. The thicknesses of the respective wall portions may be equal or differed from each other.

When the dimension of the body 11 is within the above numeric value range, the maximum thickness Dh of the thickened edge portion 11d of the body 11 is very preferably within a range of 8.0~14.0 mm, and the width Dw of the thickened edge portion 11d is very preferably within a range of 18.0~27.0 mm. In this case, a preferable example of the thicknesses of the respective wall portions is 3.0 mm, while the first curved inner surface may be within a range of R=3~8 mm, and a preferable example of it is R=5 mm.

A suitable R of the second curved inner surface can be set based on R of the first curved inner surface, the width of the flat center portion 11e, and the width of the thickened edge portion 11d, and is not particularly limited. The width of the flat center portion 11e is decided based on the relation between the overall width D of the exposed wall portion 11b and the width Dw of the thickened edge portion 11d, and is not particularly limited.

In the present embodiment, the thickness of the coating film 15 may be a dimension which allows the coating film 15 to be stretched reversibly according to the inflation of the pipe-shaped portion 14, although it depends on conditions such as a physical property of a material used for the coating film 15. In the present embodiment, a fluorine-contained resin film is preferably used as the coating film 15. Therefore, the thickness of the coating film 15 is preferably within a range of 25~300 μm, and more preferably within a range of 50~200 μm. Since the thickness of the coating film 15 is typically less than 1 mm although it depends on the material of the coating film 15, the thickness of the coating film 15 is fundamentally negligible, in terms of the dimension of the body 11. Therefore, it may be supposed that the dimension of the pipe-shaped portion 14 is substantially the dimension of the body 11.

As described above, the body 11 is preferably configured such that the coating film 15 is stacked on the outer peripheral surface of the pipe-shaped portion 14. Furthermore, in the present embodiment, as shown in FIG. 3C which is an enlarged partial cross-sectional view of the inclined wall portion 11c, the entire inner surface (hereinafter referred to as inner peripheral surface) of the pipe-shaped portion 14 is provided with a fiber-reinforced member 16. A large part of the fiber-reinforced member 16 is embedded in the pipe-shaped portion 14, and is partially exposed in the inner peripheral surface of the pipe-shaped portion 14. Although not shown in FIG. 3A showing the entire transverse cross-section of the body 11, the tubular fiber-reinforced member 16 is embedded in the pipe-shaped portion 14 on the inner peripheral side, along a lengthwise direction of the pipe-shaped portion 14.

The tubular fiber-reinforced member 16 can enhance the strength of the body 11, and improve durability of the bladder 10. Especially, since the fiber-reinforced member 16 is embedded in the pipe-shaped portion 14 such that it is partially exposed in the inner peripheral surface of the pipe-shaped portion 14, it can reinforce the entire inner surface of the pipe-shaped portion 14 which is easily inflated when the body 11 is inflated. Because of this, even if the bladder 10 is inflated in repetition, pressure resistance and dimension stability of the body 11 can be maintained stably.

A specific configuration of the fiber-reinforced member 16 is not particularly limited. The fiber-reinforced member 16 may be a cloth member having any configuration so long as it can improve a strength of the pipe-shaped portion 14 and it is stretchable according to the inflation of the body 11 during use of the bladder 10. For example, the fiber-reinforced member 16 may be suitably, a known material such as a braid, woven fabric, knit (knitted fabric), or unwoven fabric. In the same manner, the thickness of the fiber-reinforced member 16 is not particularly limited, and may be within a range of 0.1~1.0 mm in the present embodiment, although it depends on a specific configuration of the cloth member. In addition, the configuration in which the fiber-reinforced member 16 is provided in the inner peripheral surface of the pipe-shaped portion 14 is not particularly limited. A single sheet of fiber-reinforced member 16 may be embedded to cover the entire inner peripheral surface of the pipe-shaped portion 14, or plural sheets of fiber-reinforced member 16 may be arranged and embedded to cover the entire inner peripheral surface of the pipe-shaped portion 14. A band-shaped fiber-reinforced member 16 may be embedded such that it is wound in a spiral shape in the entire inner peripheral surface of the pipe-shaped portion 14, or a seamless tubular fiber-reinforced member 16 may be embedded in the pipe-shaped portion 14 to cover the entire inner peripheral surface of the pipe-shaped portion 14.

A positional relationship of yarns constituting the cloth member which is the fiber-reinforced member 16, with respect to the pipe-shaped portion 14 embedded with the fiber-reinforced member 16 is not particularly limited, but the yarns may be oriented in any direction. For example, the braid is a cloth member constituted by warp yarns which extend in plural directions and cross each other. If the fiber-reinforced member 16 is constituted by a braid composed of two warp yarns extending in two directions, one of the warp yarns may extend in a longitudinal direction (lengthwise direction) of the pipe-shaped portion 14, or may extend in a lateral direction of the pipe-shaped portion 14. Or, both of the two warp yarns may extend to be inclined with respect to the longitudinal direction or the lateral direction of the pipe-shaped portion 14.

Likewise, the woven fabric is a cloth member constituted by a warp yarn and a weft yarn which cross each other substantially orthogonally. In the woven fabric as the fiber-reinforced member 16, for example, one of the warp yarn and the weft yarn may extend in the longitudinal direction of the pipe-shaped portion 14, or in the lateral direction of the pipe-shaped portion 14. Or otherwise, the warp yarn and the weft yarn may extend to be inclined with respect to the longitudinal direction or the lateral direction of the pipe-shaped portion 14.

Likewise, the knit is a cloth member constituted by forming a loop with a single or plural yarns and running a next yarn over that loop to form a next loop. In general, a row of the loop is referred to as a wale and a column is referred to as a course. In the knit of the fiber-reinforced member 16, the wale and the course may extend in any direction with respect to the pipe-shaped portion 14. For example, one of the wale and the course may extend in the longitudinal direction of the pipe-shaped portion 14, or in the lateral direction of the pipe-shaped portion 14. Or otherwise, the wale and the course may extend to be inclined with respect to the longitudinal direction or the lateral direction of the pipe-shaped portion 14.

The fiber-reinforced member 16 need not be embedded in the pipe-shaped portion 14 such that it is exposed in the inner peripheral surface of the pipe-shaped portion 14, but may be embedded completely within a wall portion of the pipe-shaped portion 14. Since the fiber-reinforced member 16 is intended to improve durability of the pipe-shaped portion 14, the position of the fiber-reinforced member 16 embedded may be suitably set depending on conditions such as a detailed configuration of the pipe-shaped portion 14, the material used for the pipe-shaped portion 14, or a more detailed configuration of the bladder 10. For example, the fiber-reinforced member 16 may be embedded such that it is exposed in the outer peripheral surface of the pipe-shaped portion 14, without providing the coating film 15.

[Material of Body and Manufacturing Method of Body, and Manufacturing Method of Bladder]

Next, a description will be specifically given of materials used for the pipe-shaped portion 14, the coating film 15 and the fiber-reinforced member 16 constituting the body 11. In addition, a manufacturing method of the body 11 will be specifically described. Furthermore, a manufacturing method of the bladder 10 will be described.

In the bladder 10 of the present embodiment, at least the pipe-shaped portion 14 constituting the "main body portion" of the body 11 is made of the elastic material. Since the pipe-shaped portion 14 is required to be inflated by pressurization of its interior, it is preferably made of a material which is highly elastic (stretchable), although it may be made of a general elastic material. In view of this, as the material of the pipe-shaped portion 14, a heat-resistant rubber composition material is suitably used.

As the heat-resistant rubber composition material, as described above, there are a known silicone rubber composition material, and preferably fluorine-contained rubber composition material. Elastomer resin of base polymer of each of these rubber composition materials has a heat-resistant limit temperature of about 230 degrees C. and a heat-resistant safety temperature of about 180 degrees C. or higher. Therefore, these rubber composition materials are used as preferable materials for the bladder 10 used as the jig in high-temperature and high-pressure conditions.

The rubber composition material is formed in such a manner that a rubber precursor composition material which is not cross-linked and comprises a base polymer blended with an additive agent such as a curing agent or a pigment is cross-linked by heating and pressurization. A surface hardness of the pipe-shaped portion 14, for example, a surface hardness measured by a Spring type Durometer Type A according to JIS K6253 is preferably within a range of, for example, 50~85. To realize this surface hardness, the components of the rubber precursor composition material are blended.

The composition of the silicone rubber precursor composition material as the rubber precursor composition material is not particularly limited. Examples of the base polymer are polydimethyl siloxane rubber (MQ), methyl-vinyl silicone rubber (VMQ), methylphenyl polysiloxane rubber (PMQ), fluorosilicone rubber (FVMQ), etc. Examples of the curing agent are an organic peroxide such as alkyl organic peroxide. The silicone rubber precursor composition material may be blended with an additive agent such as a reinforcement material (silica), pigment, or an internal mold release agent.

Likewise, the composition of the fluorine-contained rubber precursor composition material as the rubber precursor composition material is not particularly limited. Examples of the fluorine-contained resin as the base polymer are polyvinylidene difluoride, tetrafluoroethylene-propylene copolymer, tetrafluoroethylene-perfluoro vinylether copolymer, etc. The same applies to a cutting agent or another additive agent.

As the material of the coating film 15 which is a surface layer of the body 11, a material which is low in tackiness is particularly preferable. In the present embodiment, a fluorine-contained resin composition material is particularly preferably used. Examples of the fluorine-contained resin composition material are polytetrafluoro ethylene (PTFE), tetrafluoroethylene-ethylene copolymer (ETFE), tetrafluoroethylene-perfluoro alkyl vinylether copolymer (PFA), tetrafluororethylene-hexafluoro propylene copolymer (FEP), etc. In the present embodiment, a film made of polytetrafluoro ethylene (PTFE) is used.

The fiber-reinforced member 16 corresponding to a layer on the hollow space side of the body 11, i.e., a layer on the inner peripheral surface side of the pipe-shaped portion 14 may be made of a cloth member constituted by the braid, the woven fabric, the knit, the unwoven fabric, etc., as described above. A fibrous material used for the fiber-reinforced member 16 is not particularly limited. For example, aramid fibers, nylon fibers, polyester fibers, glass fibers, carbon fibers, etc., are used. One or plural kinds of fibrous material(s) may be used.

A specific configuration of the braid for use as the fiber-reinforced member 16 is not particularly limited. Examples of the braid are a flat braided fabric, a tubular braided fabric, a warp stripe braid, a cross-linkage braid, a double braid, a braiding lace solid cord braided fabric, and the like, which are special braids. A material and dimension of yarns constituting the braid are not particularly limited. The yarns may be twisted yarns of one kind of fibrous material, or twisted yarns which are plural kinds of fibrous materials mixed. The thickness of the yarns may be within a range of, for example, 200~1500 dtex. A crossing angle of yarns in the braid may be within an angular range of, for example, 10~90 degrees. A diameter of a single yarn may be within a range of, for example, 5~50 μm. These are not particularly limited.

A specific configuration of the woven fabric for use as the fiber-reinforced member 16 is not particularly limited. Examples of the woven fabric are woven fabrics of basic weaves such as plain weave, twill weave, or satin weave, woven fabrics of derivative weaves such as plain weave derivative, twill weave derivative, or satin weave derivative, woven fabrics of special weaves such as honeycomb weave, hack aback weave, and crape weave, woven fabrics of combination weave such as weft double weave, warp double weave, and double weave, woven fabrics of twist weave, woven fabrics of pile weave such as weft pile weave or warp pile weave, woven fabric of figured stitch, etc. A material and dimension of a warp yarn and a weft yarn constituting the woven fabric are not particularly limited. The yarns may be twisted yarns of one kind of fibrous material, or twisted yarns which are plural kinds of fibrous materials mixed. The thickness of the warp yarn and the weft yarn may be within a range of, for example, 300~1500 dtex. A crossing angle of the warp yarn and the weft yarn in the woven fabric may be typically 90 degrees. A diameter of a single yarn which is the warp yarn or the weft yarn may be within a range of, for example, 10~300 μm. These are not particularly limited.

A specific configuration of the knit for use as the fiber-reinforced member 16 is not particularly limited. Examples of the knit are knit of basic weaves such as plain stitch, rib stitch, interlock stitch, and pearl stitch, knit of derivative weave such as tuck stitch, welt stitch, lace stitch, eyelet stitch, plating stitch, reverse plating stitch, pile stitch, inlaid stitch, jacquard stitch, and blister stitch (derivative weave common to each of basis weave), pique stitch, fleecy stitch, half loop transfer stitch, sinker fish net stitch, accordion stitch, embroidery plating stitch, spiral mesh (derivative weave of plain stitch), rib stitch, half cardigan stitch, full cardigan stitch, racked stitch, cable stitch, skip stitch, milano rib, and double pique (rib stitch derivative weave), knit of derivative weaves such as mock milano rib, eight lock, triple interlock stitch, single pique (derivative weaves of interlock stitch), etc. A material and dimension of yarns constituting the knit are not particularly limited. The yarns may be twisted yarns of one kind of fibrous material, or twisted yarns which are plural kinds of fibrous materials blended. The yarn constituting the fiber-reinforced member 16 of the knit are not particularly limited. The yarns may be yarns of one kind of fibrous material, or yarns which are plural kinds of fibrous materials mixed. The thickness of the yarn may be within a range of, for example, 100~1500 dtex. A diameter of a single yarn may be within a range of, for example, 5~100 μm.

Figure 4A:
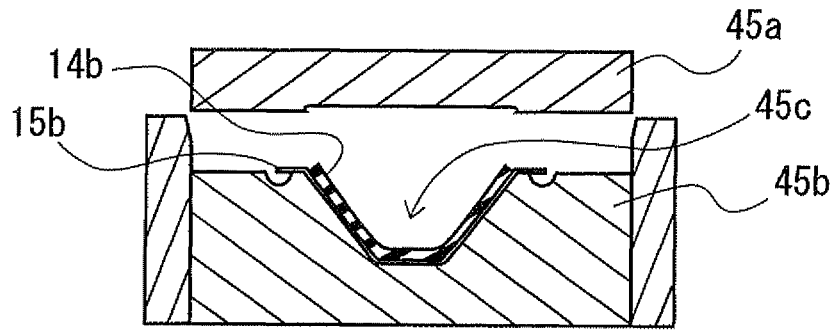
FIGS. 4A~4D are schematic views showing typical manufacturing steps of the body of FIG. 3A, respectively.

Next, an exemplary manufacturing method of the body 11 of the present embodiment will be described with reference to FIGS. 4A~4D and FIGS. 5A and 5B. FIGS. 4A~4D are schematic views showing typical manufacturing steps of the body 11 shown in FIG. 2B and FIGS. 3A~3C. FIGS. 5A and 5B are schematic views showing a modified example of the manufacturing step of FIG. 4C.

The body 11 may be manufactured by using any method known in the field of resin molding. When the body 11 includes at least the pipe-shaped portion 14, the coating film 15 and the fiber-reinforced member 16, it is preferably manufactured by die molding as shown in FIGS. 4A~4D. As shown in FIG. 4A, the die for molding the body 11 includes an upper die 45a and a lower die 45b. The lower die 45b has a cavity 45c. The cavity 45c has a channel shape extending in one direction and has a transverse cross-section of an inverted-trapezoidal shape (having a lower base at an upper side and an upper base at a lower side) conforming to the outer shape of the body 11.

Initially, as shown in FIG. 4A, the coating film 15b is placed such that it covers the entire inner surface of the cavity 45c of the lower die 45b and is extended up to the upper surface of the lower die 45b. Over the coating film 15b, a plate-shaped member 14b made of the rubber precursor composition material is placed to conform to a shape of the cavity 45c. In this case, preferably, a contact surface (upper surface) of the coating film 15b which contacts the plate-shaped member 14b has been subjected to surface treatment for the purpose of higher adhesivity to the plate-shaped member 14b. The surface treatment is not particularly limited. Examples of the surface treatment are alkaline treatment using a basic solution such as a sodium hydroxide solution, corona discharge treatment, etc. Especially when the rubber precursor composition material is the silicone rubber precursor composition material, alkaline treatment is preferably used to provide a continued adhesivity property. The upper surface of the coating film 15 may be provided with a topping sheet comprising the silicone rubber precursor composition material stacked in a layer form.

Figure 4B:
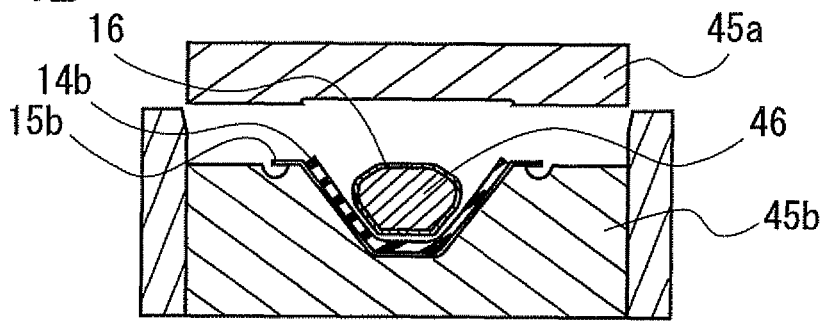
Figure 5A:
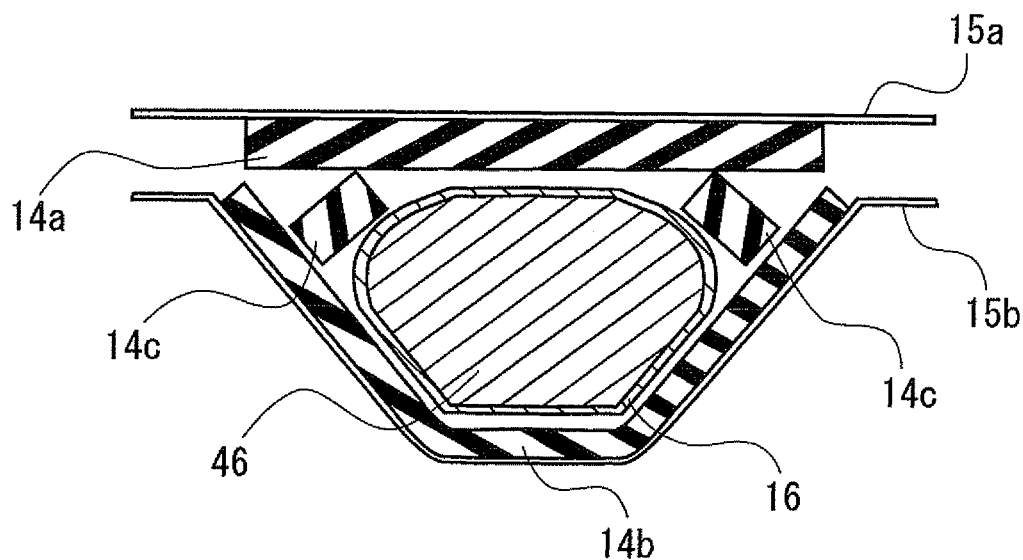
FIGS. 5A and 5B are schematic views showing modified example of the manufacturing step of FIG. 4C.
Figure 5B:
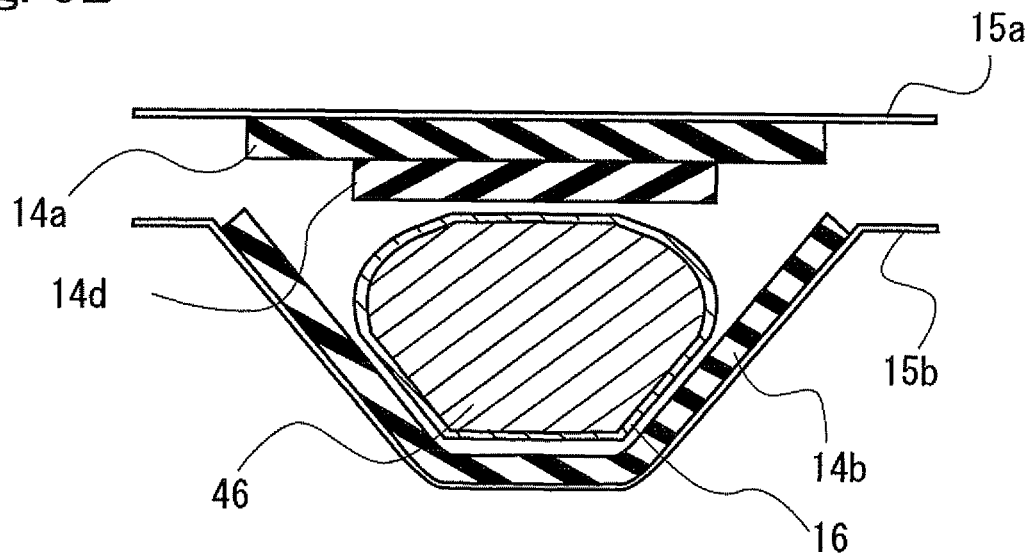

Then, as shown in FIG. 4B, to form the hollow space of the pipe-shaped portion 14, a core metal 46 is prepared. The fiber-reinforced member 16 is attached to the outer periphery of the core metal 46, and the resultant core metal 46 is placed on the upper surface of the plate-shaped member 14b made of the rubber precursor composition material. In this way, the core metal 46 is accommodated into the cavity 45c of the lower die 45b. Depending on the material or shape of the cloth member constituting the fiber-reinforced member 16, the fiber-reinforced member 16 may be subjected to adhesive joining treatment to allow the fiber-reinforced member 16 to be attached to the core metal 46. The adhesive joining treatment is not particularly limited, but may be, for example, RFL (resorcinol formaldehyde latex) treatment in which the fiber-reinforced member 16 is immersed in a RFL solution and thereafter heated. The fiber-reinforced member 16 is preferably made of a braid which is formed to have a tubular shape and increases or decreases its inner diameter according to inflation or contraction of the braid in the longitudinal direction (lengthwise direction), because the fiber-reinforced member 16 can be attached easily to the core metal 46. Or, the core metal 46 may be attached with the fiber-reinforced member 16 and then a plate-shaped member made of the rubber precursor composition material may cover the core metal 46 attached with the fiber-reinforced member 16. The plate-shaped member made of the rubber precursor composition material has a tackiness surface. Therefore, the adhesion joining treatment may be replaced by covering the outer periphery of the fiber-reinforced member 16 with the plate-shaped member made of the rubber precursor composition material.

Figure 4C:
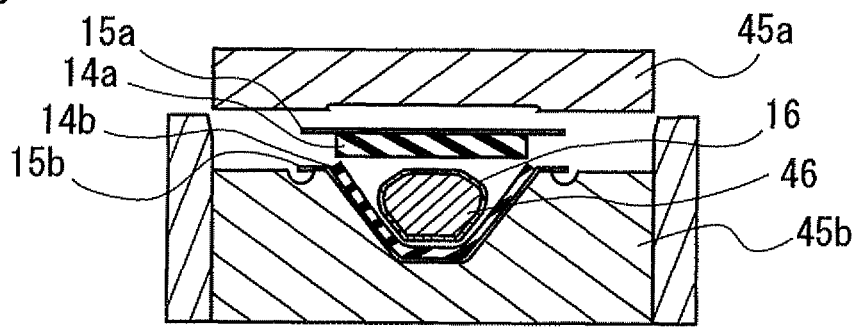

Then, as shown in FIG. 4C, the plate-shaped member 14a made of the rubber precursor composition material is placed on the upper side of the core metal 46. Further, the coating film 15a is placed on the plate-shaped member 14a. In this state, the coating film 15b on a lowermost side stored into the cavity 45c of the lower die 45b, the lower plate-shaped member 14b made of the rubber precursor composition material, the core metal 46 attached with the fiber-reinforced member 16, the upper plate-shaped member 14a made of the rubber precursor composition material, and the upper coating film 15a are superposed in this order. The lower coating film 15b, the lower plate-shaped member 14b, and the core metal 46 are accommodated into the cavity 45c. A surface (lower surface) of the upper coating film 15a which contacts the plate-shaped member 14a may be subjected to surface treatment, or may be provided with the topping sheet.

Figure 4D:
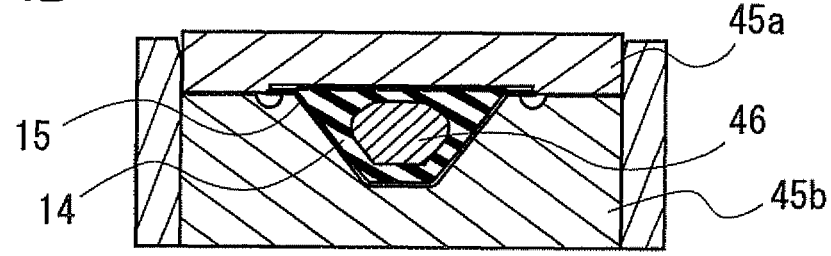

Then, as shown in FIG. 4D, the upper mold 45a is moved down, and the upper die 45a and the lower die 45b are fastened together by fastener members (not shown) and held under predetermined molding conditions (temperature range, fastening pressure, holding time, etc.). Thereby, the plate-shape members 14a and 14b melt and are fluidized into the rubber precursor composition material. The fluidized rubber precursor composition material spreads inside the cavity 45c. Cross-linking reaction proceeds and the rubber precursor composition material is cured, thereby forming the pipe-shaped portion 14. In addition, the coating films 15a and 15b are adhesively attached to the surface of the pipe-shaped portion 14, and are integrated with the pipe-shaped portion 14. The melting and fluidized rubber precursor composition material is cross-linked in a state where the fiber-reinforced member 16 is impregnated with the melting and fluidized rubber precursor composition material. As a result, the fiber-reinforced member 16 is embedded in the inner peripheral surface of the pipe-shaped portion 14.

An extra portion of the rubber precursor composition material leaks into joined portions of the lower die 45b and the upper die 45a from inside the cavity 45c through between the pair of coating films 15a and 15b retained between the lower die 45b and the upper die 45a, and is formed into burr (not shown). Thus, the pipe-shaped portion 14 with less internal deformation is molded. In addition, an extra portion of the coating films 15a and 15b is stretched to outside. The fluidized portion of the coating films 15a and 15b moves to the joined portions of the dies 45b and 45a and is formed into burr. In this way, on the outer peripheral surface of the pipe-shaped portion 14, the coating films 15a and 15b are stretched and integrated with the pipe-shaped portion 14. Thus, it is less likely that the coating film 15 has unevenness such as wrinkles or crease.

Thereafter, the upper die 45a and the lower die 45b are unfastened, the upper die 45a is opened, a molded product of the body 11 is taken out from the cavity 45c, and the core metal 46 is drawn out of the molded product, although not shown. Thereafter, the burr is removed and an outer shape is fixed, thereby completing the body 11. By removing the burr, the coating films 15a and 15b are butted with each other at both side edge portions of the exposed wall portion 11b.

In the present embodiment, the body 11 has the thickened edge portions 11d. Since the thickened edge portions 11d are thicker than another wall portions, they are made of a greater amount of rubber composite material. In the manufacturing steps, the fluidized rubber precursor composition material spreads inside the cavity 45c, and thereby the pipe-shaped portion 14 is molded. A space corresponding to the thickened edge portion 11d has a greater volume than another wall portion. It is less likely that this space is fully filled with a fluid with a high viscosity, which would make it difficult to form the thickened edge portion 11d properly.

To solve this, as shown in FIG. 5A, columnar members 14c made of rubber precursor composition material may be added into the spaces corresponding to the thickened edge portions 11d. Or, as shown in FIG. 5B, a plate-shaped member 14d may be added between the upper plate-shaped member 14a and the core metal 46. This allows the rubber precursor composition material to be fluidized and filled into the spaces corresponding to the thickened edge portions 11d more surely. As a result, the thickened edge portions 11d can be formed appropriately.

The thicknesses, dimensions and others of the plate-shaped members 14a, 14b and 14d and the columnar members 14c are not particularly limited, but may be suitably set depending on the size and shape of the molded body 11. Molding conditions for the body 11 are not particularly limited, but suitably set according to the composition and the like of the rubber precursor composition material used. To mold the body 11, another step known in the field of molding of the rubber composition material may be added, some of the steps may be omitted, or some of the steps may be changed. For example, the core metal 46 may be provided with the fiber-reinforced member 16 after the core metal 46 is covered with the plate-shaped member made of the rubber precursor composition material, and in this state, the core metal 46 may be further covered with the rubber precursor composition material. In this way, the position of the fiber-reinforced member 16 embedded with respect to the pipe-shaped portion 14 can be set.

Next, an exemplary manufacturing method of the bladder 10 of the present embodiment will be described. Initially, like the above mentioned manufacturing method, the body 11 is molded, and the terminal metal member 12 and the terminal plug 13 as the sealing members are attached to the both ends of the body 11, respectively. A known heat-resistant adhesive agent for use with a heat-resistant rubber composition material is applied to the insertion portion 12b of the terminal metal member 12 and to the insertion portion 13a of the terminal plug 13, and the insertion portions 12b and 13a are inserted into the end portions of the body 11, respectively. After that, the adhesive agent is cured to tightly seal the body 11. In this way, the bladder 10 of the present embodiment is manufactured. The conditions used in the manufacturing steps and auxiliary materials such as the adhesive agent are not particularly limited, but conditions and materials known in the field of the use of the heat-resistant rubber composition material can be suitably used.

[Method of Using Bladder]

Figure 6A:
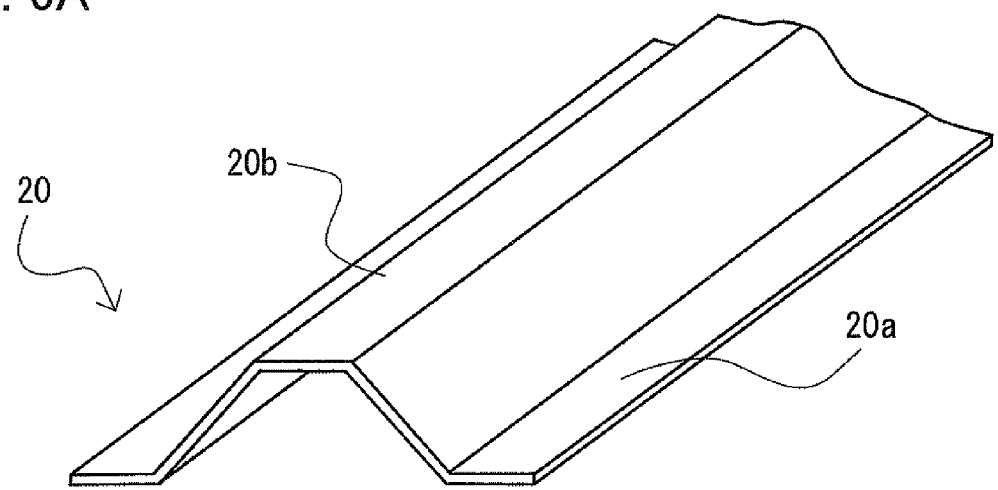
FIGS. 6A and 6B are partial perspective views showing an exemplary configuration of a hat stringer.
Figure 6B:
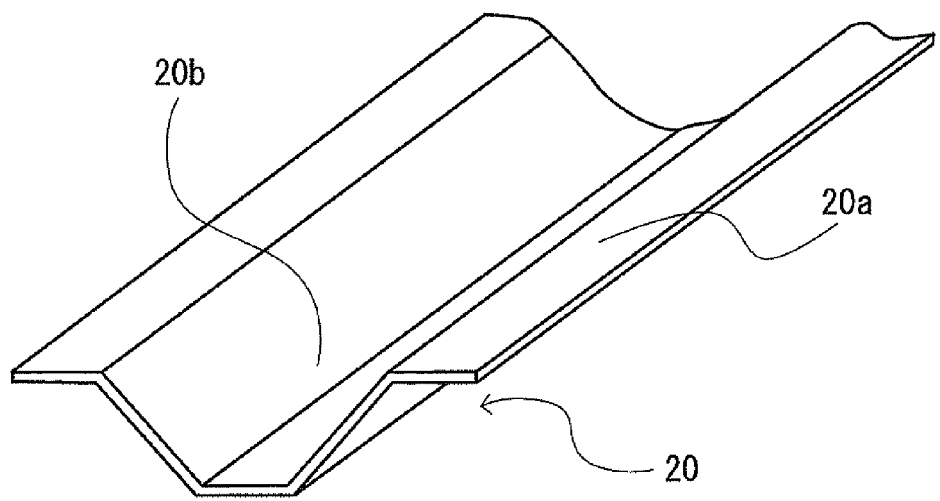
Figure 7:
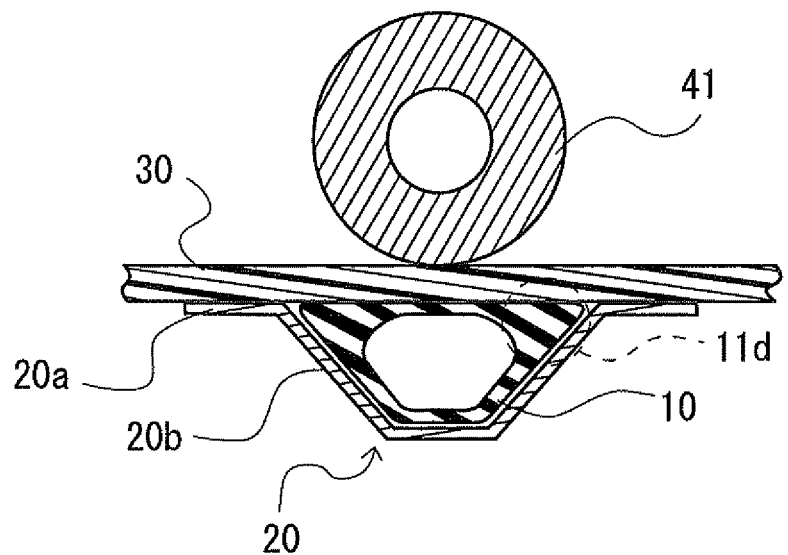
FIG. 7 is a schematic view showing cross-sections of components to show the step of stacking a pepreg on the outer periphery of a frame structure in a state where the bladder is inserted into a channel portion of the hat stringer.
Figure 8:
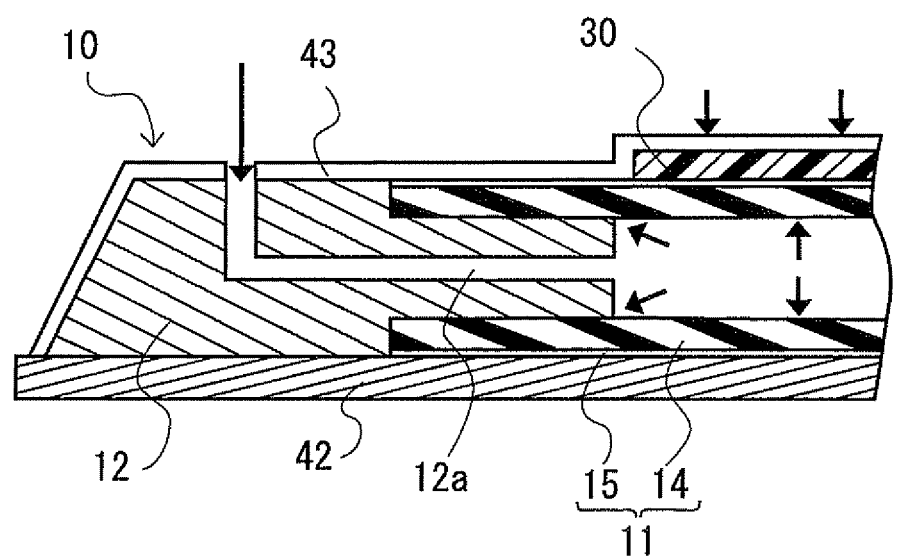
FIG. 8 is a schematic view showing a cross-section of a positional relationship among the bladder, the prepreg, and a mandrel, when the stacked prepreg is cured in an autoclave.
Figure 9:
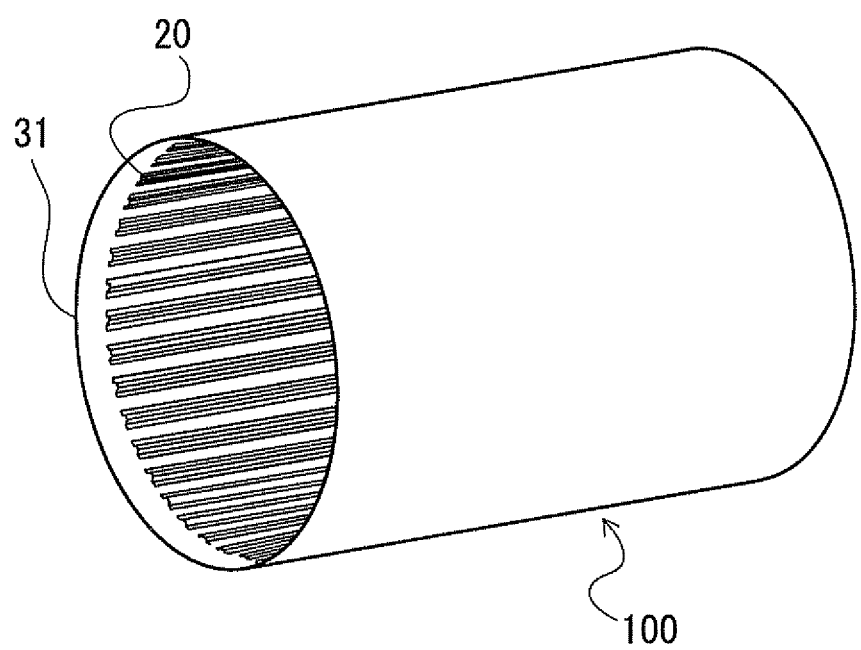
FIG. 9 is a perspective view showing a specific example of a stiffened panel constituted by the stringer and a skin.

The bladder 10 of the present embodiment is suitably used as a jig of a hat stringer included in a stiffener of a frame member, to manufacture various kinds of composite material structures using stiffened panels. This will be described with reference to FIGS. 6A and 6B, 7, and 8. FIGS. 6A and 613 are partial perspective view showing an exemplary configuration of the hat stringer. FIG. 7 is a schematic view showing the cross-section of the components to describe the step of stacking the prepreg on the outer periphery of a frame structure in a state where the bladder 10 is inserted into the channel portion of the hat stringer. FIG. 8 is a schematic view showing a cross-section of a positional relationship among the bladder, the prepreg and a mandrel when the stacked prepreg is cured in the autoclave As shown in FIGS. 6A and 6B, the hat stringer 20 has a rod shape or an elongated-plate shape extending in a particular direction. The hat stringer 20 includes a pair of flat band-shaped portions 20a which extend in parallel with each other in its lengthwise direction and a channel portion 20b which is located between the band-shaped portions 20a and is recessed from the surface of the flat portion. The upper surface of the channel portion 20h whose opening is directed downward as shown in FIG. 6A is referred to as an inner surface, while the upper surface of the channel portion 20b whose opening is directed upward is referred to as an outer surface. The bladder 10 is inserted into the channel 20b and used.

Specifically, the mandrel which is a core jig used for maintaining a cylindrical shape is prepared. The mandrel has on its outer peripheral surface, a channel-shaped recessed portion which will be attached with the hat stringer 20. The hat stringer 20 is attached to the recessed portion. In this state, the hat stringer 20 is attached to the mandrel with its outer surface being located outside, and the bladder 10 is inserted into the channel portion 20b of the hat stringer 20.

In this state, as shown in FIG. 7, the prepreg 30 is bonded to the outer surfaces of the band-shaped portions 20a of the hat stringer 20 and to the outer surface of the exposed wall portion 11b of the bladder 10. A single layer of the prepreg 30 or a stack of plural layers of the prepreg 30 is bonded to the outer surfaces. A method of bonding the prepreg 30 to the outer surfaces is not particularly limited. For example, when a structural component is a body of aircraft, its frame structure is assembled in a cylindrical shape. In this case, by using an automatic stacking machine including a stacking roller 41 as shown in FIG. 7, the prepreg 30 may be bonded and stacked while rotating the mandrel (not shown).

During stacking of the prepreg 30, the bladder 10 serves as "backing member" for the prepreg 30. Because of this, when the stacking roller 41 presses the exposed wall portion 11b of the bladder 10, the exposed wall portion 11b is deformed inwardly (dented) in the conventional configuration. This causes problems that deformation such as undulation occurs in the prepreg 30, a stacking position of the prepreg 30 is displaced, a void is generated between the layers of the prepreg 30 which are not adhesively attached to each other (unoccupied with material) due to a decreased stacking pressure, etc. To solve this, in the present embodiment, as shown in FIG. 7, the body II of the bladder 10 includes the thickened edge portions 11d at both side edge portions of the exposed wall portion 11b. The thickened edge portions 11d can significantly suppress the bladder 10 from being deformed. As a result, the above mentioned problem can be avoided.

Then, as schematically shown in FIG. 8, in a state where stacking of the prepreg 30 is complete, the bladder 10 and the hat stringer 20 (not shown in FIG. 8) are attached to the outer surface of the mandrel 42, and the prepreg 30 is wound around them. In addition, the entire structure is covered with a bagging film 43 and is introduced into the autoclave. Inside the autoclave, this structure is heated under a predetermined temperature and pressurized under a predetermined pressure. At this time, as shown in FIG. 8, a high-temperature and high-pressure atmosphere is transferred to the interior of the bladder 10 (interior of the body 11 tightly sealed) through the pressurization hole 12a of the terminal metal member 12 of the bladder 10 (arrow in FIG. 8), so that the interior of the bladder 10 is placed in a high-pressure condition, and the body 11 is inflated. The high-temperature and high-pressure atmosphere inside the autoclave is applied to the entire of the prepreg 30 (arrow in FIG. 8). As a result, curing of the prepreg 30 progresses in a state where the band-shaped portions 20a of the hat stringer 20 (not shown in FIG. 8) are strongly pressed against the prepreg 30. After the curing of the prepreg 30 is complete, a stiffened panel structure is attained, in which the frame constituted by the hat stringer 20 and the skin formed by curing the prepreg 30 are firmly adhesively attached to each other and integrated with each other.

EXAMPLES

The present invention will be described specifically using examples and comparative examples. However, the present invention is not limited to this. A person skilled in the art can change, modify or alter the present invention in various ways, without departing the scope of the present invention. Measurement and processing conditions and the like such as physical properties and the like of the examples and the comparative examples are as follows.

(Measurement of Load and Stress During Deformation of Bladder)

As a load tester, an autograph (manufactured by SHIMADZU Co., Ltd. product NO. AG-5000E) was used. A press member for pressing the bladder 10 was attached to the upper base of the autograph via an attaching jig and a bladder set jig provided with a channel portion into which the bladder 10 was inserted was attached to the lower base of the autograph.

Then, the bladder 10 was inserted into the bladder set jig. In this state, the outer surface of the exposed wall portion 11b of the bladder 10 was located at an upper side. The upper base was moved down and the tip end of the pressing member was brought into contact with the outer surface of the exposed wall portion 11b. In this position, no load was applied to the exposed wall portion 11b. Therefore, this position was set as an initial position in which a load was ON and a displacement amount (deflection amount) of the outer surface of the exposed wall portion 11b was 0 mm.

Then, the upper base was moved up. Red lead was applied between the tip end of the pressing member and the outer surface of the exposed wall portion 11b. Then, the upper base was moved down again, and the exposed wall portion 11b was pressed to a desired displacement amount. At this time, a magnitude of a load corresponding to this displacement amount was measured. Then, the upper base was moved up. A length of the red lead transferred to the outer surface of the exposed wall portion 11b was measured as a contact length, and a contact area of the pressing member and the exposed wall portion 11b was calculated. Based on the magnitude of the load and the contact area, a stress (surface pressure) corresponding to the displacement amount of the bladder 10 was calculated.

Example 1

The bladder 10 including the body 11 (see FIG. 3A) having a structure in which the width of the contact wall portion 11a was 22.9 mm, the width of the exposed wall portion 11b was 71.5 mm, the height H was 31 mm, the thickness of all wall portions was 3 mm, the width Dw of the thickened edge portion 11d was 25.75 mm, the maximum thickness Dh of the thickened edge portion 11d was 15.5 mm, R of the first curved inner surface was 8 mm, and R of the second curved inner surface was 35 mm was prepared. Measurement was made for a surface pressure and a load corresponding to 3 mm of the inward deformation of the exposed wall portion 11b in the above bladder 10. This is because it can be presumed that no problems occurs in the stack of the prepreg 30 if the inward deformation of the exposed wall portion 11b is within 3 mm when a stacking roller of φ100×400 L applies a load of 490 kPa (75 PSI, 5 kg weight/cm$^2$). In the body 11, the flat center portion 11e of the exposed wall portion 11b was 20 mm.

The pipe-shaped portion 14 of the body 11 was made of silicone rubber composition material. The coating film 15 was made of fluorine-contained resin and its thickness was 200 μm. The fiber-reinforced member 16 was made of a tubular braid of PET fibers. The thickness of the fiber-reinforced member 16 was 0.6 mm, and the diameter of the fiber-reinforced member 16 was 30 mm.

As a result of measurement, the load corresponding to 3 mm of the inward deformation of the exposed wall portion 11b was 177.1N, and the corresponding stress was 460.9 kPa (4.7 kgf/cm$^2$).

Comparative Example 1

Using a bladder including a body which is not provided with thickened edge portions, a surface pressure and a load were measured as in the example 1. As a result of measurement, a load corresponding to 3 mm of the inward deformation of the exposed wall portion 11b was 12.2N, and the corresponding stress was 39.2 kPa (0.4 kgf/cm$^2$).

As should be readily understood from the measurement result of the example 1 and the measurement result of the comparative example 1, a load which was about 14~15 times greater was needed to inwardly deform the exposed wall portion 11b of the bladder 10 of the present invention up to 3 mm, and the corresponding stress was 10 times or greater, as compared to the bladder which was not provided with the thickened edge portions 11d. In assumed use conditions of the bladder 10, the load is 490 kPa as described above. In accordance with the bladder 10 of the present invention, the inward deformation of the exposed wall portion 11b can be substantially prevented when the prepreg 30 is stacked.

Example 2

Using the bladder 10 for which the compressive load was measured in the example 1, the bladder 10 was inserted into the hat stringer 20, and an experiment on stacking of the prepreg 30 was conducted under the above conditions of stacking of the prepreg 30. As a result, the prepreg 30 was stacked favorably without generation of undulation.

Comparative Example 2

Using the bladder 10 having the above configuration, an experiment on stacking of the prepreg 30 was conducted as in the example 2. As a result, undulation was generated in the prepreg 30.

As should be readily understood from the measurement result of the example 2 and the measurement result of the comparative example 2, the exposed wall portion 11b can be suppressed from being deformed inwardly effectively by using the bladder 10 of the present invention. Thus, the prepreg 30 can be stacked favorably.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

Industrial Applicability

The present invention is suitably used in a field of manufacturing of composite material structures, in particular, in a field of manufacturing of a stiffened panel structure including a hat stringer.

The invention claimed is:

1. A jig used for manufacturing a composite material structure, the jig being inserted into a channel portion of a hat stringer and used, when the composite material structure is manufactured by attaching prepreg to a frame structure including the hat stringer as a frame member, the channel portion extending in a lengthwise direction of the hat stringer; the jig comprising: a body, wherein the body comprises a pipe shape and is made of an elastic material, wherein the body has an entirely hollow interior and a trapezoidal shape in which a transverse cross-section perpendicular to a lengthwise direction of the body has an upper base and a lower base longer than the upper base, wherein the interior of the body is tightly sealed, and the body has on one end portion thereof, a pressurization hole for pressurizing the interior of the body to inflate the body, wherein the body comprises thickened edge portions with curved inner surfaces in which base bangle portions are greater in thickness than four corner wall portions in the transverse cross-section of the trapezoidal shape, and wherein the thickened edge portions are formed only at both base angle portions of an exposed wall portion; wherein the width of the thickened edge portion is in range of 30% to 40% of the entire width of the lower base.

2. The jig used for manufacturing the composite material structure, according to claim 1, wherein a wall portion corresponding to the lower base in the transverse cross-section of the body has a shape which increases in thickness from a center portion thereof toward the both base angle portions.

3. The jig used for manufacturing the composite material structure, according to claim 2, wherein the wall portion corresponding to the lower base has a shape which increases in thickness such that a contour of a hollow space of a transverse cross-section of the wall portion draws a curve from the center portion thereof which is flat toward the both base angle portions.

4. The jig used for manufacturing the composite material structure, according to claim 1, further comprising:
a coating film covering an outer peripheral surface of the body.

5. The jig used for manufacturing the composite material structure, according to claim 4, wherein the coating film is a fluorine-contained resin film.

6. The jig used for manufacturing the composite material structure, according to claim 1, further comprising:
a tubular fiber-reinforced member embedded in a hollow space of the body on an inner surface side thereof.

7. The jig used for manufacturing the composite material structure, according to claim 1, further comprising:
sealing members for sealing both ends of the body;
wherein one of the sealing members is made of metal and is provided with the pressurization hole; and
the other of the sealing members is made of an elastic material.

8. The jig used for manufacturing the composite material structure, according to claim 1, wherein the elastic material is a heat-resistant rubber composition material.

9. The jig used for manufacturing the composite material structure, according to claim 1, wherein the thickness of the thickened edge portion is in a range of 40% to 55% of the height of the transverse cross-section.

10. The jig used for manufacturing the composite material structure, according to claim 1, wherein the curved inner surfaces of the thickened edge portions define a concave shape.

11. The jig used for manufacturing the composite material structure, according to claim 1, wherein the prepeg is disposed on the exposed wall portion, so that the body serves as a backing member for the prepeg.

12. The jig used for manufacturing the composite material structure, according to claim 1, wherein when a force is exerted in the prepeg, the thickened edge portions suppress a deformation.

* * * * *